United States Patent
Matsumura et al.

(10) Patent No.: US 11,700,607 B2
(45) Date of Patent: Jul. 11, 2023

(54) USER TERMINAL, RADIO BASE STATION AND RADIO COMMUNICATION METHOD

(71) Applicant: NTT DOCOMO, INC., Tokyo (JP)

(72) Inventors: Yuki Matsumura, Tokyo (JP); Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 111 days.

(21) Appl. No.: 16/971,364

(22) PCT Filed: Feb. 23, 2018

(86) PCT No.: PCT/JP2018/006816
§ 371 (c)(1),
(2) Date: Aug. 20, 2020

(87) PCT Pub. No.: WO2019/163111
PCT Pub. Date: Aug. 29, 2019

(65) Prior Publication Data
US 2020/0404652 A1    Dec. 24, 2020

(51) Int. Cl.
*H04W 72/21*    (2023.01)
*H04L 5/00*    (2006.01)
(Continued)

(52) U.S. Cl.
CPC ........... *H04W 72/21* (2023.01); *H04L 5/0053* (2013.01); *H04L 27/2678* (2013.01); *H04W 72/23* (2023.01)

(58) Field of Classification Search
CPC .... H04L 5/0092; H04L 5/0053; H04W 76/27; H04J 11/0069
See application file for complete search history.

(56) References Cited

U.S. PATENT DOCUMENTS

2008/0049692 A1    2/2008  Bachu et al.
2013/0039387 A1*   2/2013  Qu .................... H04L 5/0051
                                                    375/295
(Continued)

FOREIGN PATENT DOCUMENTS

JP    2009-545281 A    12/2009

OTHER PUBLICATIONS

International Search Report issued in Application No. PCT/JP2018/006816, dated May 15, 2018 (3 pages).
(Continued)

*Primary Examiner* — Ayaz R Sheikh
*Assistant Examiner* — Debebe A Asefa
(74) *Attorney, Agent, or Firm* — Osha Bergman Watanabe & Burton LLP

(57) ABSTRACT

A terminal is disclosed including a receiver that receives a system information block before establishing a radio resource control connection; and a processor that determines one physical uplink control channel (PUCCH) resource set from a plurality of PUCCH resource sets based on an index within the system information block, and determines one PUCCH resource from a plurality of PUCCH resources within the PUCCH resource set based on a control channel element (CCE) index and a PUCCH resource indicator field within a downlink control information (DCI), wherein all of the plurality of PUCCH resources includes a same number of symbols and a same start symbol index, and at least two PUCCH resources out of the plurality of PUCCH resources include different initial cyclic shift indexes. In other aspects, a radio communication method and a base station are also disclosed.

8 Claims, 18 Drawing Sheets

| INDEX i IN RMSI | PUCCH RESOURCE | | | | | | | |
|---|---|---|---|---|---|---|---|---|
| 0  | a0  | b0  | c0  | d0  | e0 | f0 | g0 | h0 |
| 1  | a1  | b1  | c1  | d1  | e1 | f1 | g1 | h1 |
| 2  | a2  | b2  | c2  | d2  | e2 | f2 | g2 | h2 |
| 3  | a3  | b3  | c3  | d3  | e3 | f3 | g3 | h3 |
| 4  | a4  | b4  | c4  | d4  | e4 | f4 | g4 | h4 |
| 5  | a5  | b5  | c5  | d5  | e5 | f5 | g5 | h5 |
| 6  | a6  | b6  | c6  | d6  | e6 | f6 | g6 | h6 |
| 7  | a7  | b7  | c7  | d7  | e7 | f7 | g7 | h7 |
| 8  | a8  | b8  | c8  | d8  | -  | -  | -  | -  |
| 9  | a9  | b9  | c9  | d9  | -  | -  | -  | -  |
| 10 | a10 | b10 | c10 | d10 | -  | -  | -  | -  |
| 11 | a11 | b11 | c11 | d11 | -  | -  | -  | -  |
| 12 | a12 | b12 | c12 | d12 | -  | -  | -  | -  |
| 13 | a13 | b13 | c13 | d13 | -  | -  | -  | -  |
| 14 | a14 | b14 | c14 | d14 | -  | -  | -  | -  |
| 15 | a15 | b15 | c15 | d15 | -  | -  | -  | -  |

Rows 0–7: 1 PUCCH RESOURCE IS SELECTED FROM 8 PUCCH RESOURCES BY USING 2-BIT VALUE IN DCI AND 1-BIT IMPLICIT VALUE Rows 8–15: 1 PUCCH RESOURCE IS SELECTED FROM 4 PUCCH RESOURCES BY USING 2-BIT VALUE IN DCI

(51) Int. Cl.
*H04L 27/26* (2006.01)
*H04W 72/23* (2023.01)

(56) References Cited

U.S. PATENT DOCUMENTS

2018/0063736 A1* 3/2018 Sadeghi ............... H04W 24/10
2021/0195586 A1* 6/2021 Kim .................. H04W 72/0406

OTHER PUBLICATIONS

Written Opinion issued in International Application No. PCT/JP2018/006816, dated May 15, 2018 (5 pages).
3GPP TS 36.300 V8.12.0, Release 8; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2;" Mar. 2010; Sophia Antipolis Valbonne, France (149 pages).
3GPP TSG RAN WG1 Meeting AH 1801; R1-1801087; "Summary of offline discussions on PUCCH resource allocation;" OPPO; Jan. 22-26, 2018; Vancouver, Canada (9 pages).
Extended European Search Report issued in counterpart European Application No. 18907336.4 dated Oct. 8, 2021 (8 pages).
LG Electronics; "Remaining issues on PUCCH resource allocation"; 3GPP TSG RAN WG1 Meeting #92, R1-1802213; Athens, Greece, Feb. 26-Mar. 2, 2018 (6 pages).
CATT; "PUCCH resource allocation"; 3GPP TSG RAN WG1 Meeting #92, R1-1801734; Athens, Greece, Feb. 26-Mar. 2, 2018 (7 pages).
CATT; "PUCCH resource allocation"; 3GPP TSG RAN WG1 Meeting AH 1801, R1-1800256; Vancouver, Canada, Jan. 22-26, 2018 (5 pages).
Office Action issued in African Application No. AP/P/2020/012642; dated Apr. 22, 2022 (4 pages).
Office Action issued in Japanese Application No. 2020-501969; dated Apr. 26, 2022 (6 pages).
Office Action issued in Indian Application No. 202037036677; dated Apr. 29, 2022 (6 pages).

* cited by examiner

FIG. 1

| INDEX i IN RMSI | PUCCH RESOURCE | | | | | | | |
|---|---|---|---|---|---|---|---|---|
| | \{1 PUCCH RESOURCE IS SELECTED FROM 8 PUCCH RESOURCES BY USING 2-BIT VALUE IN DCI AND 1-BIT IMPLICIT VALUE\} | | | | \{1 PUCCH RESOURCE IS SELECTED FROM 4 PUCCH RESOURCES BY USING 2-BIT VALUE IN DCI\} | | | |
| 0 | a0 | b0 | c0 | d0 | e0 | f0 | g0 | h0 |
| 1 | a1 | b1 | c1 | d1 | e1 | f1 | g1 | h1 |
| 2 | a2 | b2 | c2 | d2 | e2 | f2 | g2 | h2 |
| 3 | a3 | b3 | c3 | d3 | e3 | f3 | g3 | h3 |
| 4 | a4 | b4 | c4 | d4 | e4 | f4 | g4 | h4 |
| 5 | a5 | b5 | c5 | d5 | e5 | f5 | g5 | h5 |
| 6 | a6 | b6 | c6 | d6 | e6 | f6 | g6 | h6 |
| 7 | a7 | b7 | c7 | d7 | e7 | f7 | g7 | h7 |
| 8 | a8 | b8 | c8 | d8 | - | - | - | - |
| 9 | a9 | b9 | c9 | d9 | - | - | - | - |
| 10 | a10 | b10 | c10 | d10 | - | - | - | - |
| 11 | a11 | b11 | c11 | d11 | - | - | - | - |
| 12 | a12 | b12 | c12 | d12 | - | - | - | - |
| 13 | a13 | b13 | c13 | d13 | - | - | - | - |
| 14 | a14 | b14 | c14 | d14 | - | - | - | - |
| 15 | a15 | b15 | c15 | d15 | - | - | - | - |

| INDEX i IN RMSI | PUCCH RESOURCE | | | | | | | |
|---|---|---|---|---|---|---|---|---|
| 0 | a0 | b0 | c0 | d0 | e0 | f0 | g0 | h0 |
| 1 | a1 | b1 | c1 | d1 | e1 | f1 | g1 | h1 |
| 2 | a2 | b2 | c2 | d2 | e2 | f2 | g2 | h2 |
| 3 | a3 | b3 | c3 | d3 | e3 | f3 | g3 | h3 |
| 4 | a4 | b4 | c4 | d4 | e4 | f4 | g4 | h4 |
| 5 | a5 | b5 | c5 | d5 | e5 | f5 | g5 | h5 |
| 6 | a6 | b6 | c6 | d6 | e6 | f6 | g6 | h6 |
| 7 | a7 | b7 | c7 | d7 | e7 | f7 | g7 | h7 |
| PREDETERMINED FIELD VALUE IN DCI | "00" | "01" | "10" | "11" | "00" | "01" | "10" | "11" |
| IMPLICIT VALUE | "0" | | | | "1" | | | |

1 PUCCH RESOURCE IS SELECTED FROM 8 PUCCH RESOURCES BY USING 2-BIT VALUE IN DCI AND 1-BIT IMPLICIT VALUE

FIG. 2

| INDEX i IN RMSI | PUCCH RESOURCE | | | | | | | |
|---|---|---|---|---|---|---|---|---|
| 8 | a8 | b8 | c8 | d8 | - | - | - | - |
| 9 | a9 | b9 | c9 | d9 | - | - | - | - |
| 10 | a10 | b10 | c10 | d10 | - | - | - | - |
| 11 | a11 | b11 | c11 | d11 | - | - | - | - |
| 12 | a12 | b12 | c12 | d12 | - | - | - | - |
| 13 | a13 | b13 | c13 | d13 | - | - | - | - |
| 14 | a14 | b14 | c14 | d14 | - | - | - | - |
| 15 | a15 | b15 | c15 | d15 | - | - | - | - |
| PREDETERMINED FIELD VALUE IN DCI | "00" | "01" | "10" | "11" | | | | |

1 PUCCH RESOURCE IS SELECTED FROM 4 PUCCH RESOURCES BY USING 2-BIT VALUE IN DCI

| INDEX i IN RMSI | PUCCH RESOURCE | | | | | | | |
|---|---|---|---|---|---|---|---|---|
| | 1 PUCCH RESOURCE IS SELECTED FROM 8 PUCCH RESOURCES BY USING 2-BIT VALUE IN DCI AND 1-BIT IMPLICIT VALUE | | | | 1 PUCCH RESOURCE IS SELECTED FROM 6 PUCCH RESOURCES BY USING 2-BIT VALUE IN DCI AND 1-BIT IMPLICIT VALUE | | | 1 PUCCH RESOURCE IS SELECTED FROM 4 PUCCH RESOURCES BY USING 2-BIT VALUE IN DCI |
| 0 | a0 | b0 | c0 | d0 | e0 | f0 | g0 | h0 |
| 1 | a1 | b1 | c1 | d1 | e1 | f1 | g1 | h1 |
| 2 | a2 | b2 | c2 | d2 | e2 | f2 | g2 | h2 |
| 3 | a3 | b3 | c3 | d3 | e3 | f3 | g3 | h3 |
| 4 | a4 | b4 | c4 | d4 | - | - | g4 | h4 |
| 5 | a5 | b5 | c5 | d5 | - | - | g5 | h5 |
| 6 | a6 | b6 | c6 | d6 | - | - | g6 | h6 |
| 7 | a7 | b7 | c7 | d7 | - | - | g7 | h7 |
| 8 | a8 | b8 | c8 | d8 | - | - | - | - |
| 9 | a9 | b9 | c9 | d9 | - | - | - | - |
| 10 | a10 | b10 | c10 | d10 | - | - | - | - |
| 11 | a11 | b11 | c11 | d11 | - | - | - | - |
| 12 | a12 | b12 | c12 | d12 | - | - | - | - |
| 13 | a13 | b13 | c13 | d13 | - | - | - | - |
| 14 | a14 | b14 | c14 | d14 | - | - | - | - |
| 15 | a15 | b15 | c15 | d15 | - | - | - | - |

FIG. 6

| INDEX i IN RMSI | PUCCH RESOURCE #ai | | | | | | | PUCCH RESOURCE #bi | | PUCCH RESOURCE #hi | |
|---|---|---|---|---|---|---|---|---|---|---|---|
| | NUMBER OF PUCCH SYMBOLS | STARTING SYMBOL INDEX | INITIAL CS INTERVAL | FH INFORMATION | PRB LOCATION | INITIAL CS | OCC INDEX | NUMBER OF SYMBOLS IN SLOT | ⋮ | NUMBER OF SYMBOLS IN SLOT | ⋮ |
| 0 | 2 | 12 | 1 | ENABLE | 0 | 0 | N/A | 2 | ⋮ | 2 | ⋮ |
| 1 | 2 | 12 | 1 | DISABLE | 0 | 0 | N/A | 2 | ⋮ | 2 | ⋮ |
| 2 | 4 | 10 | 1 | ENABLE | 0 | 0 | 0 | 4 | ⋮ | 4 | ⋮ |
| 3 | 4 | 10 | 1 | DISABLE | 0 | 0 | 0 | 4 | ⋮ | 4 | ⋮ |
| 4 | 10 | 4 | 1 | ENABLE | 0 | 0 | 0 | 10 | ⋮ | 10 | ⋮ |
| 5 | 10 | 4 | 1 | DISABLE | 0 | 0 | 0 | 10 | ⋮ | 10 | ⋮ |
| 6 | 14 | 0 | 1 | ENABLE | 0 | 0 | 0 | 14 | ⋮ | 14 | ⋮ |
| 7 | 14 | 0 | 1 | DISABLE | 0 | 0 | 0 | 14 | ⋮ | 14 | ⋮ |
| 8 | 2 | 12 | 2 | ENABLE | 0 | 0 | N/A | 2 | ⋮ | N/A | ⋮ |
| 9 | 2 | 12 | 2 | DISABLE | 0 | 0 | N/A | 2 | ⋮ | N/A | ⋮ |
| 10 | 4 | 10 | 2 | ENABLE | 0 | 0 | 0 | 4 | ⋮ | N/A | ⋮ |
| 11 | 4 | 10 | 2 | DISABLE | 0 | 0 | 0 | 4 | ⋮ | N/A | ⋮ |
| 12 | 10 | 4 | 2 | ENABLE | 0 | 0 | 0 | 10 | ⋮ | N/A | ⋮ |
| 13 | 10 | 4 | 2 | DISABLE | 0 | 0 | 0 | 10 | ⋮ | N/A | ⋮ |
| 14 | 14 | 0 | 2 | ENABLE | 0 | 0 | 0 | 14 | ⋮ | N/A | ⋮ |
| 15 | 14 | 0 | 2 | DISABLE | 0 | 0 | 0 | 14 | ⋮ | N/A | ⋮ |

| X=0 | X=1 | X=2 | X=3 |
|---|---|---|---|
| #ai | #bi | #ci | #di |
| #ei | #fi | #gi | #hi |
| ⋮ | ⋮ | ⋮ | ⋮ |
| ⋮ | ⋮ | ⋮ | ⋮ |

| INITIAL CS | PF1 | | | |
|---|---|---|---|---|
| | X=0 | X=1 | X=2 | X=3 |
| 0 | #ai | #bi | #ci | #di |
| 3 | #ei | #fi | #gi | #hi |
| 6 | ... | ... | ... | ... |
| 9 | ... | ... | ... | ... |

FIG. 9B

| INITIAL CS | PF0 | | | |
|---|---|---|---|---|
| | X=0 | X=1 | X=2 | X=3 |
| 0 | #ai | #bi | #ci | #di |
| 4 | #ei | #fi | #gi | #hi |
| 8 | ... | ... | ... | ... |
| 0 | ... | ... | ... | ... |

| INITIAL CS | X=0 | X=1 | X=2 | X=3 |
|---|---|---|---|---|
| 0 | #ai | #bi | #ci | #di |
| 3 | #ei | #fi | #gi | #hi |
| 6 | ⋮ | ⋮ | ⋮ | ⋮ |
| 9 | ⋮ | ⋮ | ⋮ | ⋮ |
| 0 | ⋮ | ⋮ | ⋮ | ⋮ |
| 3 | ⋮ | ⋮ | ⋮ | ⋮ |
| 6 | ⋮ | ⋮ | ⋮ | ⋮ |
| 9 | ⋮ | ⋮ | ⋮ | ⋮ |

PF1

Rows 1–4: OCC INDEX=0
Rows 5–8: OCC INDEX=1

PF0 (INITIAL CS INTERVAL SET=1)

| INITIAL CS | X=0 | X=1 | X=2 | X=3 |
|---|---|---|---|---|
| 0 | #ai | #bi | #ci | #di |
| 4 | #ei | #fi | #gi | #hi |
| 8 | ... | ... | ... | ... |

FIG. 11B

PF0 (INITIAL CS INTERVAL SET=2)

| INITIAL CS | X=0 | X=1 | X=2 | X=3 |
|---|---|---|---|---|
| 0 | #ai | #bi | #ci | #di |
| 3 | #ei | #fi | #gi | #hi |

FIG. 12A

PF1 (INITIAL CS INTERVAL=1)

| INITIAL CS | X=0 | X=1 | X=2 | X=3 | |
|---|---|---|---|---|---|
| 0 | #ai | #bi | #ci | #di | ⎫ |
| 2 | #ei | #fi | #gi | #hi | ⎪ OCC INDEX=0 |
| 4 | ⋮ | ⋮ | ⋮ | ⋮ | ⎪ |
| 6 | ⋮ | ⋮ | ⋮ | ⋮ | ⎭ |
| 8 | ⋮ | ⋮ | ⋮ | ⋮ | ⎫ |
| 10 | ⋮ | ⋮ | ⋮ | ⋮ | ⎬ OCC INDEX=1 |
| 0 | ⋮ | ⋮ | ⋮ | ⋮ | ⎪ |
| 2 | ⋮ | ⋮ | ⋮ | ⋮ | ⎭ |

FIG. 12B

PF1 (INITIAL CS INTERVAL=2)

| INITIAL CS | X=0 | X=1 | X=2 | X=3 | |
|---|---|---|---|---|---|
| 0 | #ai | #bi | #ci | #di | ⎫ |
| 3 | #ei | #fi | #gi | #hi | ⎪ OCC INDEX=0 |
| 6 | ⋮ | ⋮ | ⋮ | ⋮ | ⎪ |
| 9 | ⋮ | ⋮ | ⋮ | ⋮ | ⎭ |
| 0 | ⋮ | ⋮ | ⋮ | ⋮ | ⎫ |
| 3 | ⋮ | ⋮ | ⋮ | ⋮ | ⎬ OCC INDEX=1 |
| 6 | ⋮ | ⋮ | ⋮ | ⋮ | ⎪ |
| 9 | ⋮ | ⋮ | ⋮ | ⋮ | ⎭ |

USER TERMINAL, RADIO BASE STATION AND RADIO COMMUNICATION METHOD

TECHNICAL FIELD

The present invention relates to a user terminal, a radio base station and a radio communication method in next-generation mobile communication systems.

BACKGROUND ART

In the UMTS (Universal Mobile Telecommunications System) network, the specifications of long-term evolution (LTE) have been drafted for the purpose of further increasing high speed data rates, providing lower latency and so on (see non-patent literature 1). In addition, successor systems of LTE are also under study for the purpose of achieving further broadbandization and increased speed beyond LTE (referred to as, for example, "LTE-A (LTE-Advanced)," "FRA (Future Radio Access)," "4G," "5G," "5G+(plus)," "NR (New RAT)," "LTE Rel. 14," "LTE Rel. 15 (or later versions)," and so on).

In existing LTE systems (for example, LTE Rel. 8 to 13), downlink (DL) and/or uplink (UL) communication are performed using 1-ms subframes (also referred to as "transmission time intervals (TTIs)" and so on). These subframes each serve as the unit of time for transmitting one channel-encoded data packet, and as the unit of processing in, for example, scheduling, link adaptation, retransmission control (HARQ (Hybrid Automatic Repeat reQuest)) and so on.

Also, in existing LTE systems (for example, LTE Rel. 8 to 13), a user terminal transmits uplink control information (UCI) by using an uplink control channel (for example, PUCCH (Physical Uplink Control CHannel)) or an uplink shared channel (for example, PUSCH (Physical Uplink Shared CHannel)). The format of this uplink control channel is referred to as "PUCCH format," and so on.

CITATION LIST

Non-Patent Literature

Non-Patent Literature 1: 3GPP TS36.300 V8.12.0 "Evolved Universal Terrestrial Radio Access (E-UTRA) and Evolved Universal Terrestrial Radio Access Network (E-UTRAN); Overall Description; Stage 2 (Release 8)," April, 2010

SUMMARY OF INVENTION

Technical Problem

Envisaging future radio communication systems (for example, LTE Rel. 15 and later versions, 5G, 5G+, NR, etc.), a method of allocating resources for an uplink control channel (for example, PUCCH resources) to use to transmit UCI to user terminals is under study.

For example, research is underway so that, after RRC (Radio Resource Control) connection is set up, a PUCCH resource to use to transmit UCI is allocated from one or more PUCCH resources, which are configured by higher layer signaling (for example, RRC (Radio Resource Control) signaling), based on at least one of a bit value in downlink control information (DCI) and an implicit value.

In addition, research is underway so that, before RRC connection is set up, a user terminal allocates a PUCCH resource to use to transmit UCI, from one or more PUCCH resources, which are determined in advance by the specification, based on at least one of a bit value in DCI and an implicit value.

However, with the above method, there is a possibility that a PUCCH resource to use to transmit UCI cannot be allocated properly to the user terminal.

The present invention has been made in view of the above, and it is therefore an object of the present invention to provide a user terminal, a radio base station and a radio communication method, whereby UCI can be transmitted using PUCCH resources that are properly allocated.

Solution to Problem

In accordance with one aspect of the present invention, a user terminal has a transmission section that transmits uplink control information by using an uplink control channel, a receiving section that receives system information, including an index value that is set from among a plurality of index values that at least indicate different numbers of resources for the uplink control channel, and a control section that selects, from among one or more resources indicated by the index value included in the system information, a resource for transmitting the uplink control information, based on at least one of a bit value when downlink control information and an implicit value.

In accordance with another aspect of the present invention, a radio base station has a receiving section that receives uplink control information by using an uplink control channel, a transmission section that transmits system information, including an index value that indicates one or more resources for the uplink control channel, and a control section that selects the index value, from among a plurality of index values that at least indicate different numbers of resources for the uplink control channel.

Advantageous Effects of Invention

According to the present invention, a PUCCH resource to use to transmit UCI can be properly allocated to user terminals.

BRIEF DESCRIPTION OF DRAWINGS

FIG. 1 is a diagram to show a first example of controlling the number of PUCCH resources, according to a first embodiment of the present invention;

FIG. 2 is a diagram to show an example of selecting a PUCCH resource based on a bit value in DCI and an implicit value, according to the first embodiment;

FIG. 3 is a diagram to show an example of selecting a PUCCH resource based on a bit value in DCI, according to the first embodiment;

FIG. 4 is a diagram to show a second example of controlling the number of PUCCH resources, according to the first embodiment;

FIG. 6 is a diagram to show an example of determining parameter values of PUCCH resources, according to a second embodiment of the present invention;

FIG. 8 is a diagram to show an example of deriving frequency resource information, according to the second embodiment;

FIGS. 9A and 9B are diagrams to show examples of deriving initial CS indices, according to the second embodiment;

FIG. 10 is a diagram to show an example of deriving OCC indices, according to the second embodiment;

FIGS. 11A and 11B are diagrams to show other examples of deriving initial CS indices, according to the second embodiment;

FIGS. 12A and 12B are diagrams to show other examples of deriving OCC indices, according to the second embodiment;

Figure 5:
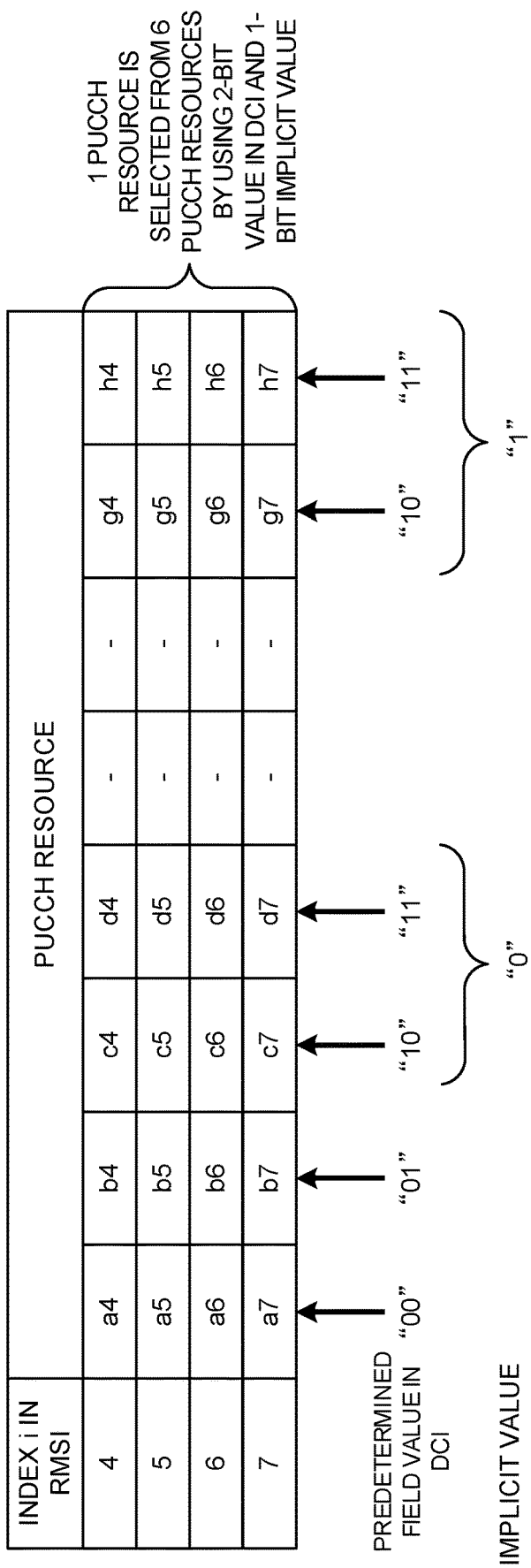
FIG. 5 is a diagram to show another example of selecting a PUCCH resource based on a bit value in DCI and an implicit value, according to the first embodiment.

DESCRIPTION OF EMBODIMENTS (Allocation of PUCCH Resources)

Envisaging future radio communication systems (for example, LTE Rel. 15 and later versions, 5G, NR, etc.), formats for uplink control channels (for example, PUCCH) to use to transmit UCI (also referred to as "PUCCH formats (PFs)," and/or the like) are under study. For example, LTE Rel. 15 is under research to support five types of formats, namely PF 0 to PF 4. Note that the names of PFs in the following description are simply examples, and different names may be used.

For example, PF 0 and PF 1 are the PFs that are used to transmit UCI (for example, delivery acknowledgment information (also referred to as "HARQ-ACK (Hybrid Automatic Repeat reQuest-ACKnowledgement)," "ACK or NACK," etc.)) of up to two bits. PF 0 can be allocated to one or two symbols, and is also referred to as "short PUCCH," "sequence-based short PUCCH" and the like. Meanwhile, PF 1 can be allocated to four to fourteen symbols, and is also referred to as "long PUCCH" and the like. In PF 1, a number of user terminals may be code-division-multiplexed (CDM) in the same PRB, by time-domain block-wise spreading using at least one of CS and OCC.

PFs 2 to 4 are the PFs that are used to transmit UCI of more than two bits (for example, channel state information (CSI), or CSI and an HARQ-ACK and/or a scheduling request (SR)). PF 2 can be allocated to one or two symbols, and is also referred to as "short PUCCH" or the like. Meanwhile, PFs 3 and 4 can be allocated to four to fourteen symbols, and are also referred to as "long PUCCH" and the like. In PF 3, a number of user terminals may be code-division-multiplexed (CDM), using pre-DFT (frequency-domain) block-wise spreading.

Resources (for example, PUCCH resources) that are used to transmit this uplink control channel are allocated by using higher layer signaling and/or downlink control information (DCI). Here, higher layer signaling may refer to, for example, a least one of RRC (Radio Resource Control) signaling, system information (for example, at least one of RMSI (Remaining Minimum System Information), OSI (Other System Information), MIB (Master Information Block) and SIB (System Information Block)), and broadcast information (PBCH (Physical Broadcast CHannel)).

<<After RRC Connection is Set Up>>

After RRC connection is set up, one or more sets (PUCCH resource sets), each including one or more PUCCH resources, are signaled to (configured in) a user terminal by higher layer signaling (for example, RRC signaling). For example, K PUCCH resource sets (for example, $1 \leq K \leq 4$) may be signaled from a radio base station (for example, a gNB (gNodeB)) to the user terminal.

Each PUCCH resource set may include M PUCCH resources (for example, $4 \leq M \leq 8$). Each of the K·M PUCCH resources may be configured in the user terminal by higher layer signaling (for example, RRC signaling).

The user terminal may select a single PUCCH resource set, from among the K PUCCH resource sets configured, based on given rules (for example, based on the payload size of UCI (or "UCI payload size")). The UCI payload size may be the number of UCI bits, not including the cyclic redundancy code (CRC) bits.

The user terminal may select a PUCCH resource to use to transmit UCI, from the M PUCCH resources included in the selected PUCCH resource set, based on at least one of DCI and an implicit value (also referred to as an "implicit indication" or an "implicit index," a "value derived in the user terminal," a "given value," etc.).

<<Before RRC Connection is Set Up>>

On the other hand, before RRC connection is set up, it is not possible to configure (signaled) at least one PUCCH resource in the user terminal by using RRC signaling. Meanwhile, it might occur that UCI needs to be transmitted even before RRC connection is set up.

For example, before RRC connection is set up, random access procedures are executed between the user terminal and the radio base station.

(1) The user terminal transmits a preamble (also referred to as "random access preamble," "random access channel (PRACH (Physical Random Access CHannel))," etc.).

(2) Upon detecting the preamble, the radio base station transmits a random access response (also referred to as "RAR (Random Access Response)," "message 2," etc.).

(3) The user terminal establishes uplink synchronization based on a timing advance (TA) included in message 2, and transmits a higher layer (L2/L3) control message (message 3) by using the PUSCH. This control message includes the user terminal's identifier (for example, C-RNTI (Cell-Radio Network Temporary Identifier)).

(4) In response to the higher layer control message, the radio base station transmits a contention resolution message (message 4), by using the PDSCH.

(5) The user terminal transmits an HARQ-ACK, in response to this message 4, to the radio base station, by using the PUCCH.

In the random access procedures exemplified above, UCI to include an HARQ-ACK in response to message 4 needs to be transmitted, and the problem then lies in how the user terminal should select the PUCCH resource to use to transmit this UCI.

So, study is underway to allow the user terminal, before RRC connection is set up, to select a PUCCH resource to use to transmit UCI from one or more PUCCH resources (also referred to as "PUCCH resource candidates," "PUCCH resource set," etc.) that are indicated by an index value (also referred to as "given field value," "given value," etc.) in system information (for example, RMSI), based on a bit value (also referred to as "given field value," "index value," "given value," etc.) in DCI, and/or an implicit value.

As for the bit value in DCI, research is conducted to make it possible to select four types of PUCCH resources by using, for example, a bit value of two bits.

Also, the implicit value may be, for example, derived based on at least one of the following parameters:

The index of control resource units (CCEs (Control Resource Elements));
 The index of a control resource set (CORESET);
 The index of a search space;
 The index (for example, the starting index) of frequency resources (for example, PRG (Precoding Resource Block Group), RBG (Resource Block Group) or PRBs (Physical Resource Blocks)) allocated to the PDSCH;
 The value of a transmission power control (TPC) command field;
 The state of a transmission configuration indicator (TCI) for the PDCCH and/or the PDSCH (TCI state);
 The number of UCI bits;
 Configuration information of the demodulation reference signal (DMRS) for the PDCCH and/or the PDSCH; and
 The type of an HARQ-ACK codebook.

However, when the method of allocating PUCCH resources before RRC connection is set up and/or after RRC connection is set up is used, there is a possibility that a PUCCH resource to use to transmit UCI cannot be allocated properly to the user terminal.

For example, before RRC connection is set up, the number of one or more PUCCH resources (the number of PUCCH resources) indicated by an index value in system information (for example, RMSI) cannot be controlled, and, as a result of this, there is a possibility that PUCCH resources cannot be allocated flexibly to the user terminal.

So, the present inventors have come up with the idea of associating at least two index values in system information (for example, RMSI) with different numbers of PUCCH resources, so as to control the number of PUCCH resources that a user terminal can select based on at least one of a bit value in DCI and an implicit value (first embodiment).

Also, before RRC connection is set up, trying to define all the PUCCH resources indicated by all of the index values in system information (for example, RMSI) in the specification might lead to increased load of designing the specification. Similarly, after RRC connection is set up, trying to signal all the PUCCH resources in all the PUCCH resource sets through higher layer signaling (for example, RRC signaling) might lead to increased overhead.

So, the present inventors have come up with the idea of reducing the load of designing the specification and/or the load of signaling by determining in advance (or pre-configuring) the parameter values of some PUCCH resources, and then deriving the parameter values of other PUCCH resources from these parameter values (the second example of determining parameter values according to the second embodiment).

Now, embodiments of the present invention will be described below in detail. Note that, in the following description, the system information to include index values that indicate one or more PUCCH resources is RMSI, but any information may be used as long as it is broadcast in given units (for example, in cell units).

First Embodiment

With a first embodiment of the present invention, how to control the number of PUCCH resources to allocate to a user terminal will be described.

According to the first embodiment, a user terminal selects the PUCCH resources to use to transmit UCI from one or more PUCCH resources indicated by an index value in RMSI (also referred to as "given field," "RMSI index," etc.) based on at least one of a bit value in DCI and an implicit value.

The bit value in DCI may also be referred to as "given field value," "PUCCH resource indicator field," "ACK/NACK resource indicator (ARI)," "ACK/NACK resource offset (ARO)," "TPC command field," and the like.

The value of an RMSI index (for example, four bits) may be set (determined) from one or more index values that each indicate a number of PUCCH resources, where the resource for transmitting UCI can be selected by using the bit value in DCI alone, and one or more index values that indicate a number of resources, where the resource for transmitting UCI can be selected by using a combination of the bit value and the implicit value.

For example, by setting RMSI indices with different values per cell (component carrier (CC), carrier, etc.), the number of PUCCH resources to allocate to a user terminal can be controlled on a per cell basis, and the number of PUCCH resource candidates to select in the user terminal can be controlled.

First Example of Controlling the Number of PUCCH Resources

FIG. 1 is a diagram to show a first example of controlling the number of PUCCH resources, according to the first embodiment. Although an example case will be described below, with reference to FIG. 1, in which a four-bit index (RMSI index) is provided in RMSI, and a two-bit second field is provided in DCI, these numbers of bits of the first field and the second field are by no means limiting.

As shown in FIG. 1, the value of each index in RMSI (hereinafter also referred to as "RMSI index") may indicate one or more PUCCH resources. For example, in FIG. 1, RMSI indices "0" to "7" each indicate eight PUCCH resources (#ai to #hi (i=0 to 7)). Meanwhile, RMSI indices "8" to "15" each indicate four PUCCH resources (#ai to #di (i=8 to 15)).

When the user terminal receives one of RMSI indices "0" to "7," the user terminal may select a PUCCH resource to use to transmit UCI, from eight PUCCH resources, by using a bit value in DCI and an implicit value.

Meanwhile, when the user terminal receives one of RMSI indices "8" to "15," the user terminal may select a PUCCH resource to use to transmit UCI, from four PUCCH resources, by using a bit value in DCI.

FIG. 2 is a diagram to show an example of selecting a PUCCH resource based on a bit value in DCI and an implicit value, according to the first embodiment. FIG. 2 shows an example of selecting a PUCCH resource when RMSI indices "0" to "7" of FIG. 1 are received. Note that, although the number of PUCCH resources that each RMSI index indicates is eight in FIG. 2, this is by no means limiting, and any number of PUCCH resources that can be identified using a combination of a bit value in DCI and an implicit value may be used.

As shown in FIG. 2, PUCCH resources #ai to #hi, indicated by RMSI index #i (i=0 to 7), are each associated with a bit value in DCI. For example, referring to FIG. 2, PUCCH resources #ai to #di are associated with bit values "00," "01," "10," and "11" in DCI, respectively. Similarly, PUCCH resources #ei to #hi are associated with bit values "00," "01," "10," and "11" in DCI, respectively.

The user terminal selects one of multiple PUCCH resources indicated by the bit values of the same DCI, based on an implicit value. For example, in FIG. 2, where the bit value "00" in DCI indicates two PUCCH resources #ai and #ei, the user terminal selects PUCCH resource #ai if the one-bit implicit value is "0," and selects PUCCH resource #ei if the implicit value is "1."

FIG. 3 is a diagram to show an example of selecting a PUCCH resource based on a bit value in DCI, according to the first embodiment. FIG. 3 shows an example of selecting a PUCCH resource when RMSI indices "8" to "15" of FIG. 1 are received. Note that, although the number of PUCCH resources that each RMSI index indicates is four in FIG. 3, this is by no means limiting, and any number of PUCCH resources that can be identified using a bit value in DCI may be used.

As shown in FIG. 3, PUCCH resources #ai to #di, indicated by RMSI index #i (i=8 to 15), are each associated with a bit value in DCI. For example, referring to FIG. 3, PUCCH resources #ai to #di are associated with bit values "00," "01," "10," and "11" in DCI, respectively. The user terminal may select a PUCCH resource that is indicated by a bit value in DCI, and transmit UCI using this PUCCH resource.

In the first example of control, RMSI index #i includes values (i=0 to 7) that indicate eight PUCCH resources #ai to #hi, and values (i=8 to 15) that indicate four PUCCH resources #ai to #di. Therefore, the number of PUCCH resources to allocate to the user terminal can be controlled to two types of four and eight, and the number of PUCCH resources that the user terminal can select can be controlled. Also, RMSI index #i is determined for each cell, so that the number of PUCCH resources to allocate to the user terminal can be controlled on a per cell basis.

Second Example of Controlling the Number of PUCCH Resources

FIG. 4 is a diagram to show a second example of controlling the number of PUCCH resource candidates, according to the first embodiment. The second example of control will be described below, primarily focusing on differences from the first example of control.

As shown in FIG. 4, the value of each index in RMSI (hereinafter also referred to as "RMSI index") may indicate one or more PUCCH resources. For example, FIG. 4 is different from FIG. 1 in that RMSI indices "4" to "7" each indicate six PUCCH resources (#ai to #di and #gi to #hi (i=0 to 7)).

When the user terminal receives one of RMSI indices "4" to "7," the user terminal may select a PUCCH resource to use to transmit UCI, from six PUCCH resources, by using a bit value in DCI and an implicit value. Note that the operation for when one of RMSI indices "0" to "3" and "8" to "15" is received is the same as in the first example of control.

FIG. 5 is a diagram to show another example of selecting a PUCCH resource based on a bit value in DCI and an implicit value, according to the first embodiment. FIG. 5 shows an example of selecting a PUCCH resource when RMSI indices "4" to "7" of FIG. 4 are received. Note that, although the number of PUCCH resources that each RMSI index indicates is eight in FIG. 5, this is by no means limiting, and any number of PUCCH resources that can be identified using a combination of a bit value in DCI and an implicit value may be used.

As shown in FIG. 5, PUCCH resources #ai to #di and #gi to #hi, indicated by RMSI index #i (i=4 to 7), are each associated with a bit value in DCI. For example, referring to FIG. 5, PUCCH resources #ai to #di are associated with bit values "00," "01," "10," and "11" in DCI, respectively. Similarly, PUCCH resources #gi to #hi are associated with bit values "10" and "11" in DCI, respectively.

When the user terminal receives a bit value in DCI that indicates a single PUCCH resource (in FIG. 5, "00" or "01"), the user terminal selects this single PUCCH resource.

On the other hand, when the user terminal receives a bit value in DCI (in FIG. 5, "10" or "11") that indicates multiple PUCCH resources, the user terminal selects one of the multiple PUCCH resources based on an implicit value. For example, where the bit value "10" in DCI indicates two PUCCH resources #ci and #gi, the user terminal selects PUCCH resource #ci if the one-bit implicit value is "0," and selects PUCCH resource #gi if the implicit value is "1."

Note that, in FIG. 5, the bit values "10" and "11" in DCI each indicate multiple PUCCH resources, but this is by no means limiting. For example, the bit values "10" and "11" in DCI may each indicate a single PUCCH resource and the bit values "00" and "01" in DCI each indicate multiple PUCCH resources, and one of the multiple PUCCH resources may be selected by the implicit value.

In the second example of control, RMSI index #i includes values (i=0 to 3) that indicate eight PUCCH resources #ai to #hi, values (i=4 to 7) that indicate six PUCCH resources #ai to #di and #gi to #hi, and values (i=8 to 15) that indicate four PUCCH resources #ai to #di. Therefore, the number of PUCCH resources to allocate to the user terminal can be selected from the three types of 4, 6 and 8, so that the number of PUCCH resources that the user terminal can select in each cell can be controlled more flexibly than the first example of control.

<Control of RMSI Index Value>

In the first embodiment, the radio base station may select an RMSI index value based on the number of user terminals in a cell (CC or carrier) (also referred to as "the number of user terminals connected to the cell," "the number of connections," "the number of UE connections," etc.).

For example, referring to FIG. 1, in a cell where the number of user terminal connections is greater than (or greater than or equal to) a given threshold, the radio base station may transmit (broadcast) RMSI, which includes an RMSI index (which ranges from "0" to "7") that indicates more PUCCH resources.

Meanwhile, referring to FIG. 1, assuming that the number of user terminal connections in a cell is smaller than or equal to (or smaller than) a given threshold, the radio base station may transmit (broadcast) RMSI, which includes an RMSI index (which ranges from "8" to "15") that indicates fewer PUCCH resources.

Similarly, when three or more steps of numbers of PUCCH resource candidates (for example, three steps of 4, 6 and 8 in FIG. 4) are provided, the radio base station may select the number of candidates corresponding to one step, based on the number of user terminal connections, and transmit (broadcast) RMSI including an RMSI index that indicates the selected number of candidates of PUCCH resources.

In this way, the radio base station selects an RMSI index value based on the number of user terminal connections in the cell, so that the number of PUCCH resource candidates that can be selected can be controlled on a per user terminal basis.

In addition, the radio base station specifies an RMSI index value that indicates fewer PUCCH resources, so that the radio base station can specify the PUCCH resource the user terminal uses to transmit UCI, based on a bit value in DCI, without using an implicit value. By this means, it is possible to avoid placing limitations on the configuration values of parameters that are used to derive the implicit value.

For example, when the implicit value is derived based on CCE indices, it is possible to avoid placing limitations on the allocation of CCEs to the PDCCH. In addition, when the implicit value is derived based on the indices of frequency resources (for example, PRGs or PRBs) allocated to the PDSCH, it is possible to avoid placing limitations on the allocation of frequency resources to the PDSCH. Furthermore, when the implicit value is derived based on the value of the TPC command field, it is possible to avoid placing limitations on TPC.

Second Embodiment

With a second embodiment of the present invention, an example of determining each PUCCH resource's value will be described below. Each PUCCH resource may include at least one of the following parameter values. Note that, for each parameter, a range of possible values may be defined, per PUCCH format.

The number of symbols allocated to the PUCCH in a slot (the number of PUCCH symbols);
The index of the symbol where the PUCCH starts being allocated (the starting symbol index or the starting symbol number);
Initial cyclic shift (CS) interval (initial CS interval);
Information that shows whether or not frequency hopping is enabled for the PUCCH (frequency hopping (FH) information);
Information that shows the frequency resources allocated to the PUCCH (for example, physical resource block (PRB)) (also referred to as "frequency resource information," "the starting index of frequency resources," "PRB location," etc.);
The index of initial cyclic shift (CS) (also referred to as "initial CS index," "initial CS," etc.);
The index of orthogonal spreading code (for example, OCC (Orthogonal Cover Code)) in the time domain (OCC index);
The length of the OCC used in block-wise spreading before discrete Fourier transform (DFT) (also referred to as "OCC length," "spreading factor," etc.);
The index of the OCC used in block-wise spreading after DFT;
The number of PRBs allocated to the PUCCH; and
The index of the second-hop frequency resource when frequency hopping is enabled (frequency resource index).

With the second embodiment, the parameter values included in each of one or more PUCCH resources indicated by above-mentioned RMSI index #i (for example, 0≤i≤15 if the RMSI index is four bits) may be determined in advance by the specification (the first example of determining parameter values). Alternatively, at least part of the parameter values of part of the PUCCH resources indicated by RMSI index #i may be determined in advance by the specification, and, from the parameter values of the part of the PUCCH resources, the parameter values of the rest of the PUCCH resources may be derived (the second example of determining parameter values).

Here, in FIG. 1, one or more PUCCH resources indicated by above RMSI index #i are, for example, PUCCH resources #ai to #hi if 0≤i≤7 applies, and PUCCH resources #ai to #di if 8≤i≤15 applies. Also, in FIG. 4, one or more PUCCH resources indicated by RMSI index #i are PUCCH resources #ai to #hi if 0≤i≤3 applies, PUCCH resources #ai to #di, #gi and #hi if 4≤i≤7 applies, and PUCCH resources #ai to #di if 8≤i≤15 applies.

First Example of Determining Parameter Value

In the first example of determining parameter values, the parameter values included in all the PUCCH resources indicated by above-mentioned RMSI index #i (for example, 0≤i≤15 if the RMSI index is four bits) are determined in advance by the specification.

FIG. 6 is a diagram to show an example of determining parameter values of PUCCH resources, according to the second embodiment. In FIG. 6, each PUCCH resource includes the number of symbols in a slot, the starting symbol index, the initial CS interval, information to show whether or not frequency hopping is enabled, the PUCCH PRB location, the initial CS index, and the OCC index, but the types of parameters included in each PUCCH resource are not limited to these.

Note that other PUCCH resources (not shown) may include the same types and/or different types of parameters from those of PUCCH resource #a0. In addition, each PUCCH resource may include the same number of parameters or different numbers of parameters. Furthermore, the value of each parameter is not limited to that shown in FIG. 6.

FIG. 6 assumes a case in which, as shown in FIG. 1, RMSI index value i (0≤i≤7) indicates eight PUCCH resources #ai to #hi, and RMSI index value i (8≤i≤15) indicates four PUCCH resources #ai to #di, but this is by no means limiting.

For example, FIG. 6 shows a table defining the parameter values included in all the PUCCH resources indicated by RMSI index value #i (here, eight PUCCH resources #a to #h if 0≤i≤7 applies, and four PUCCH resources #a to #d if 8≤i≤15 applies).

In FIG. 6, the parameter values in all the PUCCH resources indicated by the same RMSI index value and by different RMSI index values are defined in a single table, but this is by no means limiting. For example, a table may be provided for each RMSI index value (for example, sixteen tables may be provided for RMSI index values i=0 to 15).

Alternatively, a table may be defined for each PUCCH resource that includes the same types of parameters (for example, eight tables may be provided for PUCCH resources #ai to #hi). Note that, here, PUCCH resources #ai to #hi include the same types of parameters even if the RMSI index value i varies, but it is not necessary to include the same types of parameters.

According to the first example of determining parameter values, the parameter values included in all the PUCCH resources indicated by above-mentioned RMSI index #i (for example, 0≤i≤15 if the RMSI index is four bits) are determined in advance by the specification, and therefore the user terminal itself does not need to determine the parameter values, so that the processing load on the user terminal can be reduced.

Second Example of Determining Parameter Value

With the second example of determining parameter values, at least part of the parameter values of part of the PUCCH resources indicated by RMSI index #i (for example, 0≤i≤15 if the RMSI index is four bits) may be determined in advance by the specification, and, from the parameter values of the part of the PUCCH resources, the parameter values of the rest of the PUCCH resources may be derived.

To be more specific, with the second example of determining parameter values, one or more parameter values in a specific PUCCH resource (for example, PUCCH resource #ai in FIG. 6) among a number of PUCCH resources indicated by the same RMSI index value i may be defined by the specification, and, from these parameter values, one or more parameter values in other PUCCH resources (for example, PUCCH resources #bi to #hi in FIG. 6) may be derived.

Hereinafter, examples of deriving (1) the number of PUCCH symbols, (2) the starting symbol index, (3) frequency hopping (FH) information, (4) frequency resource information, (5) the initial CS, (6) the OCC index, and (7) the initial CS interval, will be described in detail.

(1) Example of Controlling the Number of PUCCH Symbols

The number of PUCCH symbols may be common (or cell-specific) among a number of PUCCH resources indicated by the same RMSI index #i (for example, PUCCH resources #ai to #hi in FIG. 1). This is so because the values of RMSI indices are cell-specific, and the number of PUCCH symbols depends on the range or the coverage of cells and may be common among the user terminals in a cell.

For example, when the number of PUCCH symbols "2" is defined in the specification for PUCCH resource #a0 of RMSI index #0 (see FIG. 6), the user terminal may derive, from this number "2" of PUCCH symbols in PUCCH resource #a0, the number of PUCCH symbols "2" in other PUCCH resources #b0 to #h0.

(2) Example of Deriving the Starting Symbol Index

The PUCCH starting symbol index may be common (or cell-specific) among a number of PUCCH resources indicated by the same RMSI index #i (for example, PUCCH resources #ai to #hi in FIG. 1), or may be determined based on the number of PUCCH symbols, which has been described earlier.

For example, where the starting symbol index "12" for PUCCH resource #a0 of RMSI index #0 is defined in the specification (see FIG. 6), the user terminal may derive, from the starting symbol index "12" for PUCCH resource #a0, the starting symbol index "12" for other PUCCH resources #b0 to #h0.

Alternatively, the starting symbol index for each of PUCCH resources #b0 to #h0 may be derived from the number of PUCCH symbols derived for each of PUCCH resources #b0 to #h0 of RMSI index #0. For example, the starting symbol index "12" may be derived if the number of PUCCH symbols is "2," and the starting symbol index "10" may be derived if the number of PUCCH symbols is "4." In this way, the starting symbol index may be derived based on the number of symbols in a slot minus the number of PUCCH symbols.

(3) Example of Deriving Frequency Hopping (FH) Information

The FH information, which shows whether or not to enable frequency hopping for the PUCCH, may be common (or cell-specific) among a number of PUCCH resources indicated by the same RMSI index #i (for example, PUCCH resources #ai to #hi in FIG. 1).

For example, when the FH information "enable" for PUCCH resource #a0 of RMSI index #0 is defined in the specification (see FIG. 6), the user terminal may derive, from this FH information for PUCCH resource #a0, the FH information "enable" for other PUCCH resources #b0 to #h0.

Meanwhile, given that the FH information "disable" for PUCCH resource #a1 of RMSI index #1 is defined in the specification (see FIG. 6), the user terminal may derive, from this FH information for PUCCH resource #a1, the FH information "disable" for other PUCCH resources #b1 to #h1.

When frequency hopping for the PUCCH is enabled, a frequency diversity effect is gained, so that the coverage is improved. On the other hand, when frequency hopping is disabled, it becomes easier to concentrate the frequency resources to use for the PUCCH in a given field, so that the frequency resources that can be allocated to at least one of the PDCCH, the PDSCH and the PUSCH can be increased, and the flexibility in the use of frequency can be improved.

In particular, it is likely that the frequency resources (for example, PRBs) to be allocated to the PUCCH before RRC connection is set up cannot be changed (that is, fixed) without making changes to the specification. Consequently, by disabling frequency hopping, spectral efficiency can be improved.

Also, whether frequency hopping for the PUCCH is a mandatory function or an optional function (option) may vary depending on the frequency band. For example, it is likely that PUCCH frequency hopping is a mandatory function when the frequency band the user terminal uses is lower than or equal to (or lower than) a given threshold (for example, 6 GHz), and that this frequency hopping is an optional function when the frequency band used is higher than (or higher than or equal to) a given threshold (for example, 6 GHz).

If frequency hopping for the PUCCH is an optional function, the radio base station cannot acquire the user terminal's capability information before RRC connection is set up, and therefore the radio base station cannot know which user terminals support that frequency hopping.

Consequently, if the frequency band used in a cell is lower than or equal to (or lower than) a given threshold (for example, 6 GHz) (that is, when the above frequency hopping is a mandatory function), RMSI index #i (for example, i is an even value in FIG. 6), where the FH information in PUCCH resource #ai, which is determined in advance by the specification, is "enable," may be transmitted (broadcast) in the cell. In this case, the user terminal may derive "enable," which is the same as with PUCCH resource #ai, as FH information for other PUCCH resources under the same RMSI index #i.

On the other hand, if the frequency band used in a cell is higher than (or higher than or equal to) a given threshold (for example, 6 GHz) (that is, when the above frequency hopping is an optional function), RMSI index #i (for example, i is an odd value in FIG. 6), where the FH information in PUCCH resource #ai, which is determined in advance by the specification, is "disable," may be transmitted (broadcast) in the cell. In this case, the user terminal may derive "disable,"

which is the same as with PUCCH resource #ai, as FH information for other PUCCH resources under the same RMSI index #i.

As described above, whether the value of the RMSI index is an even value or an odd value and whether the FH information in PUCCH resources is "enable" or "disable" may be provided associated with each other (see FIG. 6). Note that, in FIG. 6, the RMSI index values of even values indicate the FH information "enable," and the RMSI index values of odd values indicate the FH information "disable," but the RMSI index values of odd values may indicate the FH information "enable," and the RMSI index values of even values may indicate the FH information "disable."

(4) Example of Deriving Frequency Resource Information

The frequency resources for the PUCCH (for example, the PRB location or the starting PRB index) may be determined, based on given rules, among a number of PUCCH resources (for example, PUCCH resources #ai to #hi) indicated by RMSI index #i (for example, 0≤i≤15).

Figure 7A:
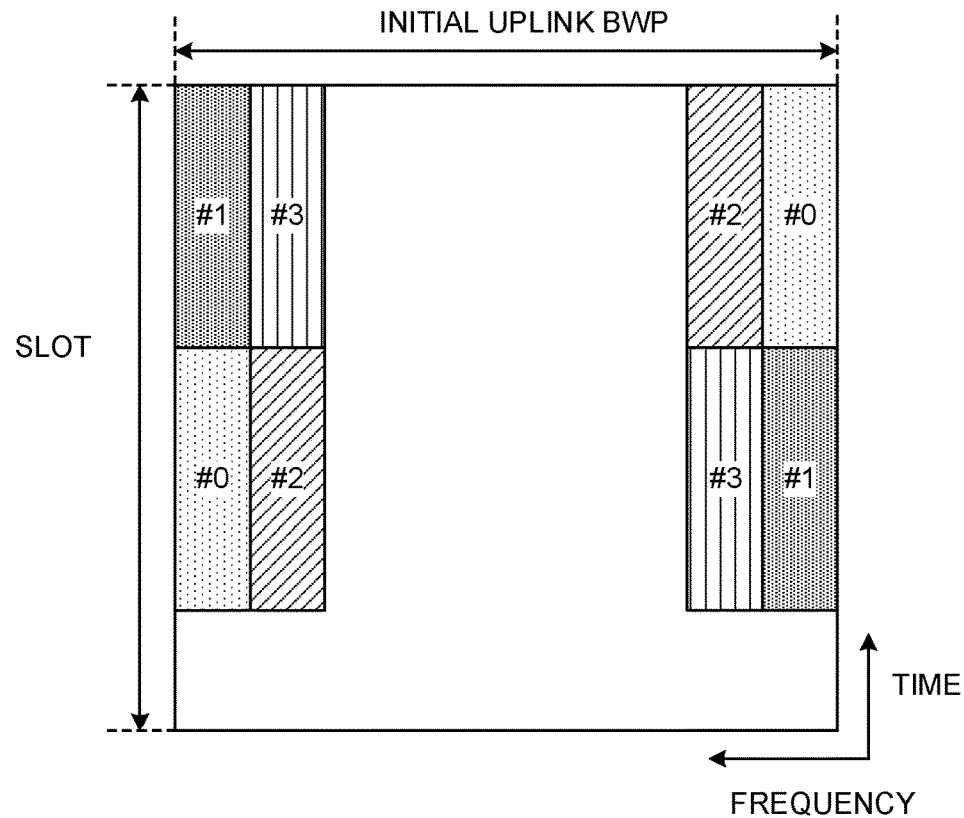
FIGS. 7A and 7B are diagrams to show examples of PUCCH resource regions, according to the second embodiment.
Figure 7B:
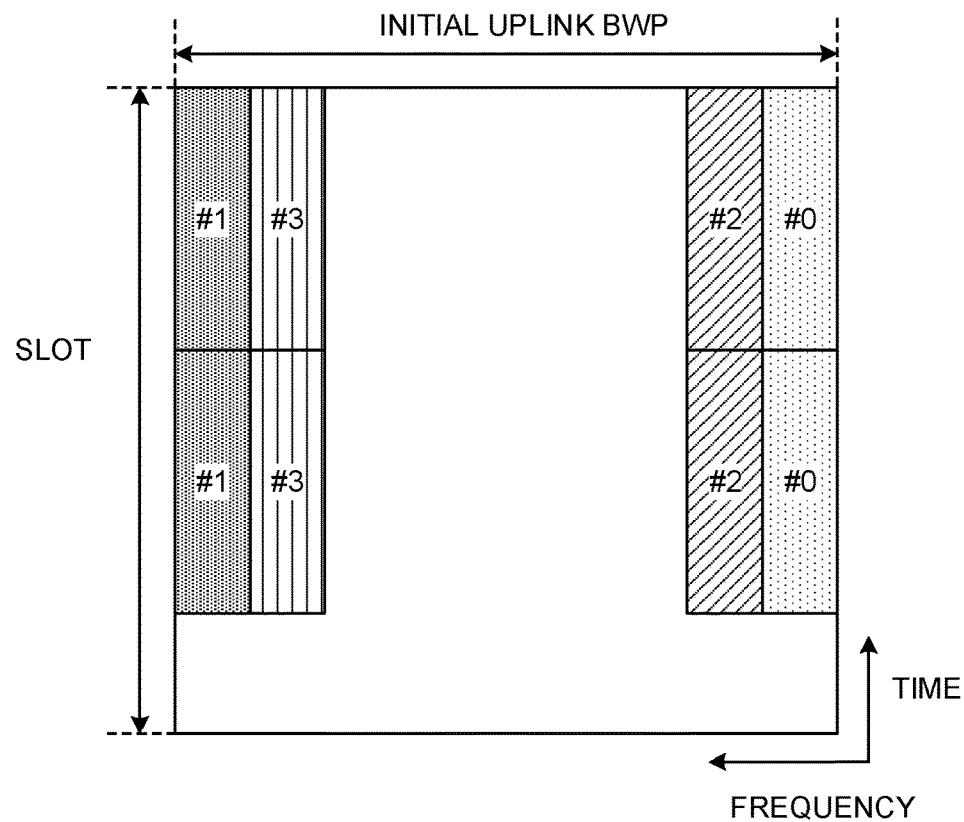

FIGS. 7A and 7B are diagrams to show examples of PUCCH resource regions, according to the second embodiment. FIG. 7A shows a case in which frequency hopping is enabled, and FIG. 7B shows a case in which frequency hopping is disabled.

For example, FIGS. 7A and 7B show resource regions #0 to #3 in one slot, in which the frequency resources of PUCCH resources #ai to #hi of RMSI index #i are allocated. Referring to FIG. 7A, at least part of the multiple resource regions (for example, in FIG. 7A, two resource regions #0 and #1 or two resource regions #2 and #3) may use the same frequency resource. On the other hand, as shown in FIG. 7B, multiple resource regions may use different frequency resources.

In the case of FIG. 7B, the starting locations (starting PRB indices) of resource regions #0 to #3 in the frequency direction all have different distances from the starting location of a given frequency region (for example, a bandwidth part (BWP), the uplink BWP for initial access, etc.). Consequently, each resource region (ranging from #0 to #3 in FIG. 7B) may be identified by the distance from the starting location of that given frequency region. Note that a BWP is a partial band (also referred to as a "bandwidth part," or the like) in the carrier (cell, CC, etc.) configured in the user terminal.

Figure 8:
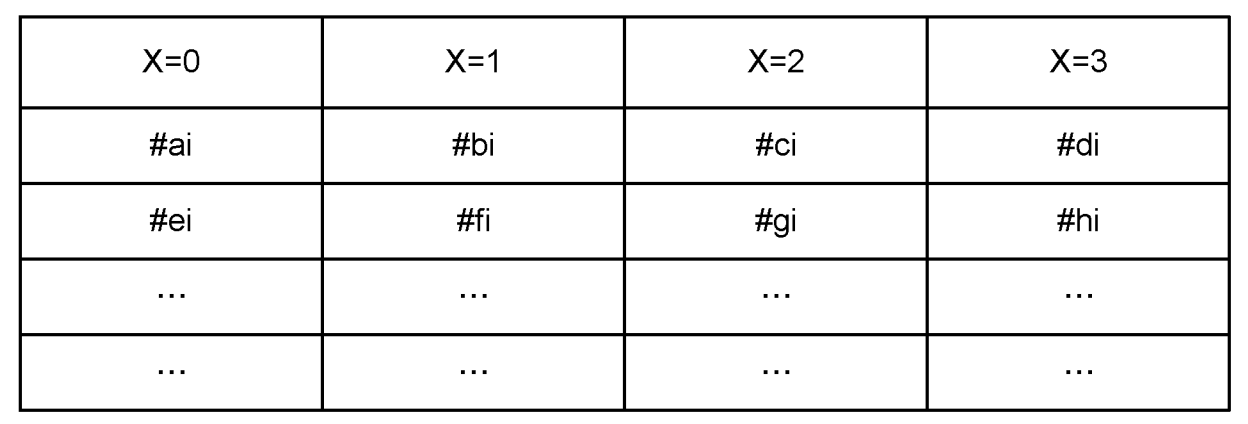

FIG. 8 is a diagram to show an example of deriving frequency resource information, according to the second embodiment. With reference to FIG. 8, an example in which the frequency resources of PUCCH resources #ai to #hi of RMSI index #i (for example, 0≤i≤15) are allocated in resource region #X (for example, #0 to #3 in FIGS. 7A and 7B) will be described. That is, X is the index of each resource region (the distance from the starting location of each resource region's BWP, or the starting PRB of each resource region).

For example, as shown in FIG. 8, when the starting PRB index of resource region #0 is defined as the starting PRB index of PUCCH resource #a0 of RMSI index #0 by the specification, the user terminal may derive the starting PRB indices of other PUCCH resources #b0 to #h0 from given rules. For example, referring to FIG. 8, the starting PRB indices of other PUCCH resources #b0 to #h0 may be derived from the remainder of the number of resource regions (here, four).

Note that the starting PRB index of PUCCH resource #ai (1≤i≤15) may be determined in advance by the specification, may be derived based on PUCCH resource #a0, or may be specified by the value of a given field in DCI. The starting PRB indices of PUCCH resources #bi to #hi (1≤i≤15) may be derived based on the starting PRB index of PUCCH resource #ai, (1≤i≤15), may be derived based on PUCCH resource #a0, or may be specified by the value of a given field in DCI.

(5) Example of Deriving the Initial CS Index

The initial CS (the index of the initial CS (initial CS index)) for the PUCCH may be determined, based on given rules, among a number of PUCCH resources (for example, PUCCH resources #ai to #hi) indicated by RMSI index #i (for example, 0≤i≤15).

FIGS. 9A and 9B are diagrams to show examples of deriving initial CS indices, according to the second embodiment. FIG. 9A shows an example of deriving initial CS indices in PF 1, in which the number of symbols is greater than two, and FIG. 9B shows an example of deriving initial CS indices in PF 0, in which the number of symbols is two or less.

As shown in FIGS. 9A and 9B, the initial CS indices of PUCCH resources #ai to #hi of RMSI index #i (for example, 0≤i≤15) may be determined based on resource region #X (for example, #0 to #3 in FIGS. 7A and 7B). As shown in FIGS. 9A and 9B, the same CS index may be assigned to PUCCH resources #ai to #hi if the resource region varies.

Also, as shown in FIGS. 9A and 9B, the types and/or the number of initial CS indices that can be used (assigned) may be different for each PF. For example, as shown in FIG. 9A, PF 1 uses one CS to transmit one bit of UCI, so that four initial CS indices (here, 0, 3, 6, and 9) can be used. On the other hand, as shown in FIG. 9B, PF 0 uses two CSs (the initial CS index and the CS index that is 180 degrees apart from the initial CS index) to transmit one bit of UCI, so that three initial CS indices can be used (here, 0, 4, and 8).

For example, as shown in FIGS. 9A and 9B, when initial CS index #0 is defined as the initial CS index for PUCCH resource #ai of RMSI index #i by the specification, the user terminal may derive the initial CS indices for other PUCCH resources #bi to #hi from resource region #X. For example, referring to FIG. 8, where there are a number of PUCCH resources to match the number of resource regions (here, four), different CS indices are allocated per PUCCH resource.

Note that the initial CS index for PUCCH resource #ai (1≤i≤15) may be determined in advance by the specification, or may be derived based on the initial CS index for PUCCH resource #a0 specified in the specification.

In FIGS. 9A and 9B, the initial CS indices of PUCCHs allocated to the same resource region #X can be made different among PUCCH resources #ai to #hi having the same RMSI index #i, so that the number of user terminals to which PUCCHs can be allocated simultaneously (the number of user terminals to be multiplexed) can be increased.

(6) Example of Deriving the OCC Index

The OCC index for the PUCCH may be determined, based on given rules, among a number of PUCCH resources (for example, PUCCH resources #ai to #hi) indicated by RMSI index #i (for example, 0≤i≤15).

FIG. 10 is a diagram to show an example of deriving OCC indices, according to the second embodiment. FIG. 10 shows an example of deriving OCC indices in PF 1, in which block-wise spreading using OCC is applied.

As shown in FIG. 10, the OCC indices for PUCCH resources #ai to #hi of RMSI index #i (for example, 0≤i≤15) may be determined based on resource region #X (for example, #0 to #3 in FIGS. 7A and 7B) and/or the initial CS index. As shown in FIG. 10, the same OCC index may be assigned to PUCCH resources #ai to #hi if the resource region and the initial CS index vary.

Note that the OCC index for PUCCH resource #ai (1≤i≤15) may be determined in advance by the specification, or may be derived based on the OCC index for PUCCH resource #a0 specified in the specification.

In FIG. 10, the OCC indices for PUCCHs allocated to the same resource region #X and having the same initial CS index can be made different, so that the number of user terminals to which PUCCHs can be allocated simultaneously (the number of user terminals to be multiplexed) can be increased.

(7) Example of Deriving the Initial CS Interval

The interval between initial CS indices (initial CS interval) may be common (or cell-specific) among a number of PUCCH resources (for example, PUCCH resources #ai to #hi in FIG. 1) indicated by the same RMSI index #i.

For example, cells having larger coverage or cells with more obstacles such as buildings show greater delay spread (DS), and cells having smaller coverage or cells with fewer obstacles show less delay spread. In this way, delay spread is determined by the situation of cells (cell conditions), so that, improved flexibility can be achieved by determining the initial CS interval based on cell conditions.

As has been described with the example of deriving (5) initial CS indices, the types and/or the number of initial CS indices that can be used (assigned) may be different for each PF. Consequently, one or more types of sets (initial CS interval sets) that define initial CS intervals on a per PF basis may be provided.

Two types of initial CS interval sets may be defined as follows, for example.

Initial CS interval set #1:
Initial CS indices for PF 0={0, 4, 8}
Initial CS indices for PF 1={0, 2, 4, 6, 8, 10}
Initial CS interval set #2:
Initial CS indices for PF 0={0, 3}
Initial CS indices for PF 1={0, 3, 6, 9}

FIGS. 11A and 11B are diagrams to show other examples of deriving initial CS indices, according to the second embodiment. FIGS. 11A and 11B are different from PF 0 of FIG. 9A in that the initial CS indices for PUCCH resources #ai to #hi of RMSI index #i (for example, 0≤i≤15) are derived for each type of initial CS interval set (also referred to simply as "initial CS interval"). Note that, although PF 1 of FIG. 9B is not shown here, initial CS indices may be derived for each initial CS interval set, in a similar way.

FIGS. 12A and 12B are diagrams to show other examples of deriving OCC indices, according to the second embodiment. FIGS. 12A and 12B are different from PF 1 of FIGS. 11A and 11B in that the OCC indices for PUCCH resources #ai to #hi of RMSI index #i (for example, 0≤i≤15) are derived for each type of initial CS interval set (also referred to simply as "initial CS interval").

<Variations>

The above-described first and second examples of determining parameter values have been described on the assumption that these examples are applied before RRC connection is set up (in combination with the first embodiment). On the other hand, the second example of determining parameter values may be applied not only before RRC connection is set up (in combination with the first embodiment), but also after RRC connection is set up (the second embodiment alone).

For example, when the second example of determining parameter values is applied after RRC connection is set up, "RMSI index #i" may be replaced with "index #i (0≤i≤K-1) of K PUCCH resource sets." Also, "one or more PUCCH resources indicated by RMSI index #i" may be replaced with "M PUCCH resources (M≥1) of PUCCH resource set #i."

(Radio Communication System) Now, the structure of a radio communication system according to the present embodiment will be described below. In this radio communication system, the radio communication methods according to the above-described embodiments are employed. Note that the radio communication methods according to the herein-contained embodiments may be each used alone, or at least two of them may be combined and used.

Figure 13:
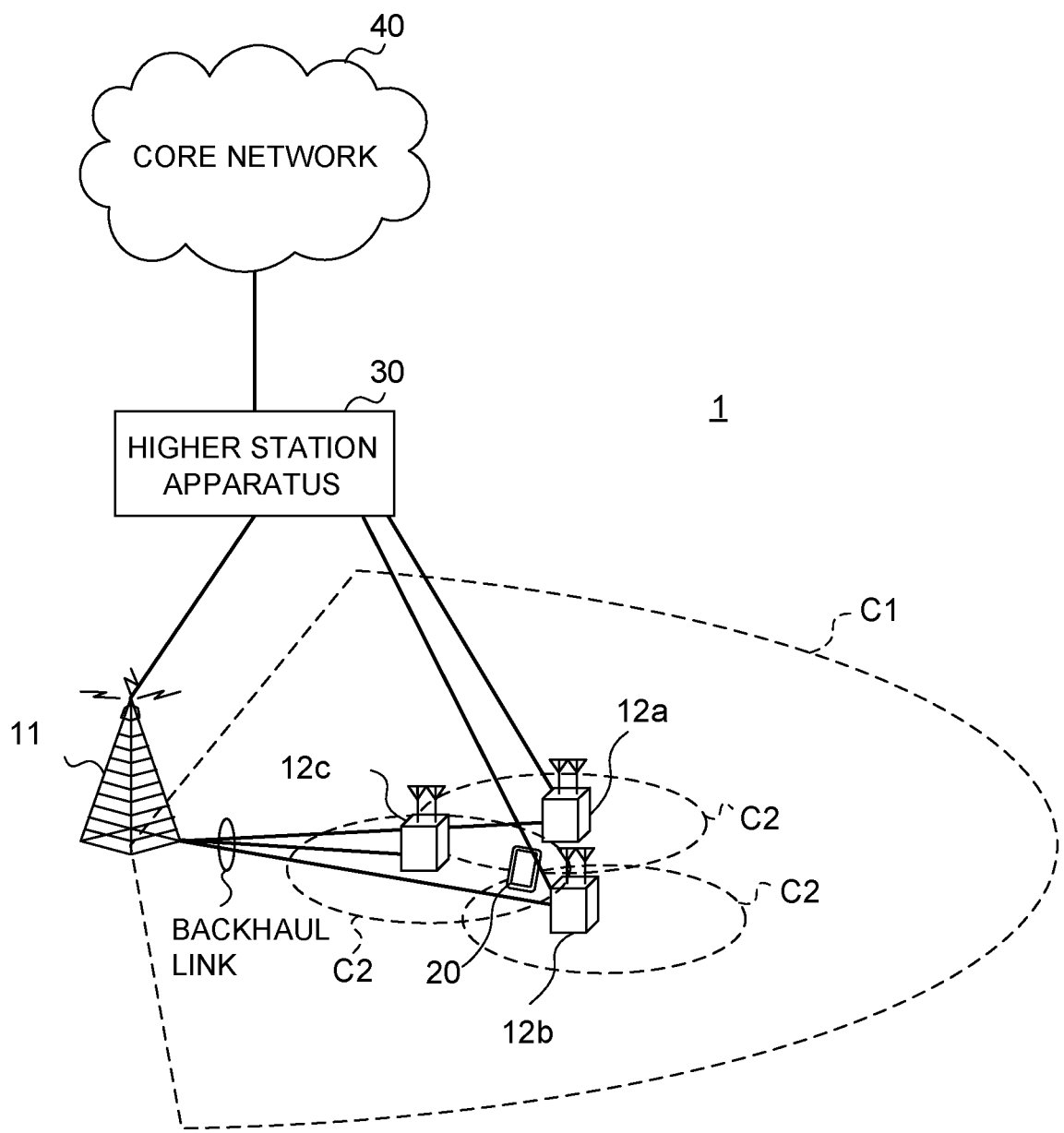
FIG. 13 is a diagram to show an exemplary schematic structure of a radio communication system, according to the present embodiment.

FIG. 13 is a diagram to show an exemplary schematic structure of a radio communication system according to the present embodiment. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit. Note that the radio communication system 1 may be referred to as "SUPER 3G," "LTE-A, (LTE-Advanced)" "IMT-Advanced," "4G," "5G," "FRA (Future Radio Access)," "NR (New RAT (New Radio Access Technology))," and the like.

The radio communication system 1 shown in FIG. 13 includes a radio base station 11 that forms a macro cell C1, and radio base stations 12a to 12c that are placed within the macro cell C1 and that form small cells C2, which are narrower than the macro cell C1. Also, user terminals 20 are placed in the macro cell C1 and in each small cell C2. A structure in which different numerologies are applied between cells/within cells may be adopted here.

Here, a numerology refers to a communication parameter in the frequency direction and/or the time direction (for example, at least one of subcarrier spacing, the bandwidth, the length of a symbol, the length of CP (CP length), the length of a subframe, the time length of a TTI (TTI length), the number of symbols per TTI, the radio frame configuration, the filtering process, the windowing process, etc.). In the radio communication system 1, for example, subcarrier spacings such as 15 kHz, 30 kHz, 60 kHz, 120 kHz and 240 kHz may be supported.

The user terminals 20 can connect with both the radio base station 11 and the radio base stations 12. The user terminals 20 may use the macro cell C1 and the small cells C2, which use different frequencies, at the same time, by means of CA or DC. Also, the user terminals 20 can execute CA or DC by using a plurality of cells (CCs) (for example, two or more CCs). Furthermore, the user terminals can use licensed-band CCs and unlicensed-band CCs as a plurality of cells.

Furthermore, the user terminals 20 can communicate based on time division duplexing (TDD) or frequency division duplexing (FDD) in each cell. A TDD cell and an FDD cell may be referred to as a "TDD carrier (frame structure type 2)" and an "FDD carrier (frame structure type 1)," respectively.

Furthermore, in each cell (carrier), a single numerology may be used, or a plurality of different numerologies may be used.

Between the user terminals 20 and the radio base station 11, communication can be carried out using a carrier of a relatively low frequency band (for example, 2 GHz) and a narrow bandwidth (referred to as, for example, an "existing carrier," a "legacy carrier," and/or the like). Meanwhile, between the user terminals 20 and the radio base stations 12, a carrier of a relatively high frequency band (for example, 3.5 GHz, 5 GHz, 30 to 70 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between two radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but these are by no means limiting. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "gNB (gNodeB)," a "transmitting/receiving point (TRP)," and so on. Also, the radio base stations 12 are radio base stations each having a local coverage, and may be referred to as "small base stations," "micro base stations," "pico base stations," "femto base stations," "HeNBs (Home eNodeBs)," "RRHs (Remote Radio Heads)," "eNBs," "gNBs," "transmitting/receiving points" and so on. Hereinafter, the radio base stations 11 and 12 will be collectively referred to as "radio base stations 10," unless specified otherwise.

The user terminals 20 are terminals that support various communication schemes such as LTE, LTE-A, 5G, NR and so on, and may not be limited to mobile communication terminals, and may be stationary communication terminals. Furthermore, the user terminals 20 can perform device-to-device (D2D) communication with other user terminals 20.

In the radio communication system 1, as radio access schemes, OFDMA (orthogonal Frequency Division Multiple Access) can be applied to the downlink (DL), and SC-FDMA (Single-Carrier Frequency Division Multiple Access) can be applied to the uplink (UL). OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to the combination of these, and OFDMA may be used in the UL.

Also, in the radio communication system 1, a multi-carrier waveform (for example, OFDM waveform) or a single-carrier waveform (for example, DFT-s-OFDM waveform) may be used.

In the radio communication system 1, a DL shared channel (PDSCH (Physical Downlink Shared CHannel), also referred to as a "DL data channel" or the like), which is shared by each user terminal 20, a broadcast channel (PBCH (Physical Broadcast CHannel)), downlink L1/L2 control channels and so on are used as DL channels. At least one of user data, higher layer control information, SIBs (System Information Blocks) and so forth is communicated by the PDSCH. Also, the MIB (Master Information Blocks) is communicated by the PBCH.

The L1/L2 control channels include DL control channels (such as PDCCH (Physical Downlink Control CHannel), EPDCCH (Enhanced Physical Downlink Control CHannel), etc.), PCFICH (Physical Control Format Indicator CHannel), PHICH (Physical Hybrid-ARQ Indicator CHannel) and so on. Downlink control information (DCI), including PDSCH and PUSCH scheduling information, is communicated by the PDCCH. The number of OFDM symbols to use for the PDCCH is communicated by the PCFICH. The EPDCCH is frequency-division-multiplexed with the PDSCH and used to communicate DCI and so on, like the PDCCH. HARQ retransmission control information (ACK/NACK) in response to the PUSCH can be communicated in at least one of the PHICH, the PDCCH and the EPDCCH.

In the radio communication system 1, a UL shared channel (PUSCH (Physical Uplink Shared CHannel), also referred to as an "uplink shared channel" or the like), which is shared by each user terminal 20, an uplink control channel (PUCCH (Physical Uplink Control CHannel)), a random access channel (PRACH (Physical Random Access CHannel)) and so on are used as UL channels. User data, higher layer control information and so on are communicated by the PUSCH. Uplink control information (UCI), including at least one of retransmission control information (ACK/NACK) in response to DL signals, channel state information (CSI) and so on, is communicated by the PUSCH or the PUCCH. By means of the PRACH, random access preambles for establishing connections with cells can be communicated.

(Radio Base Station)

Figure 14:
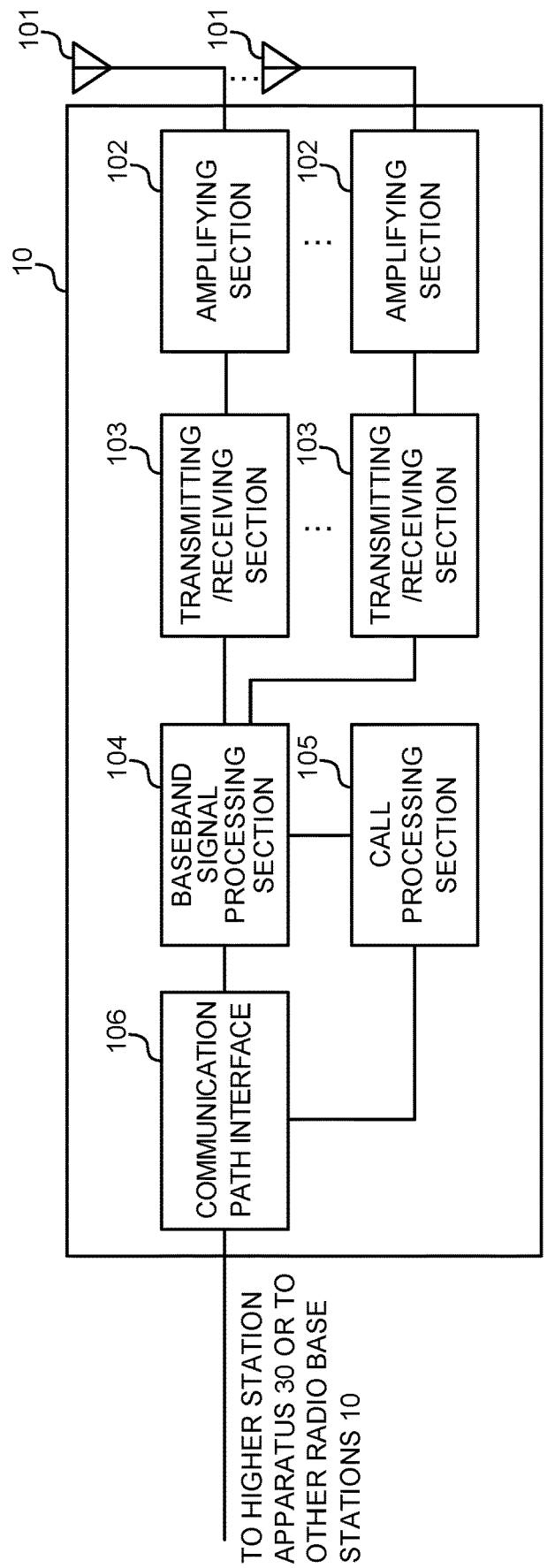
FIG. 14 is a diagram to show an exemplary overall structure of a radio base station, according to the present embodiment.

FIG. 14 is a diagram to show an exemplary overall structure of a radio base station according to the present embodiment. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 in DL is input from the higher station apparatus 30, to the baseband signal processing section 104, via the communication path interface 106.

In the baseband signal processing section 104, the user data is subjected to transmission processes, including a PDCP (Packet Data Convergence Protocol) layer process, division and coupling of the user data, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process, a precoding process and so forth, and the result is forwarded to each transmitting/receiving section 103. Furthermore, downlink control signals are also subjected to transmission processes such as channel coding and an inverse fast Fourier transform, and forwarded to the transmitting/receiving sections 103.

Baseband signals that are pre-coded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101.

A transmitting/receiving section 103 can be constituted by a transmitters/receiver, a transmitting/receiving circuit or a transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for UL signals, radio frequency signals that are received in the transmitting/receiving antennas 101 are amplified in the amplifying sections 102. The transmitting/receiving sections 103 receive the UL signals amplified in the amplifying sections 102. The received signals are converted into the baseband signal through frequency conversion in the transmitting/receiving sections 103 and output to the baseband signal processing section 104.

In the baseband signal processing section 104, UL data that is included in the UL signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (such as setting up and releasing communication channels), manages the state of the radio base stations 10 and manages the radio resources.

The communication path interface section 106 transmits and receives signals to and from the higher station apparatus 30 via a given interface. Also, the communication path interface 106 may transmit and receive signals (backhaul signaling) with neighboring radio base stations 10 via an inter-base station interface (which is, for example, optical fiber in compliance with the CPRI (Common Public Radio Interface), the X2 interface, etc.).

Furthermore, the transmitting/receiving sections 103 transmit DL signals (including at least one of DL data signals, DL control signals (DCI) and DL reference signals) to the user terminal 20, and receive UL signals (including at least one of UL data signals, UL control signals and UL reference signals) from the user terminal 20.

Also, the transmitting/receiving sections 103 receive UCI from the user terminal 20 by using an uplink shared channel (for example, PUSCH) or an uplink control channel (for example, a short PUCCH and/or a long PUCCH). This UCI may include at least one of an HARQ-ACK in response to a DL data channel (for example, PDSCH), CSI, an SR, beam identification information (for example, a beam index (BI)), and a buffer status report (BSR).

Also, the transmitting/receiving sections 103 may receive uplink control information using the uplink control channel. In addition, the transmitting/receiving sections 103 may transmit system information (for example, RMSI), which contains an index value that indicates one or more resources (PUCCH resources) for the above uplink control channel. Moreover, the transmitting/receiving sections 103 may transmit information that shows one or more resources for the uplink control channel, by higher layer signaling (for example, RRC signaling).

Figure 15:
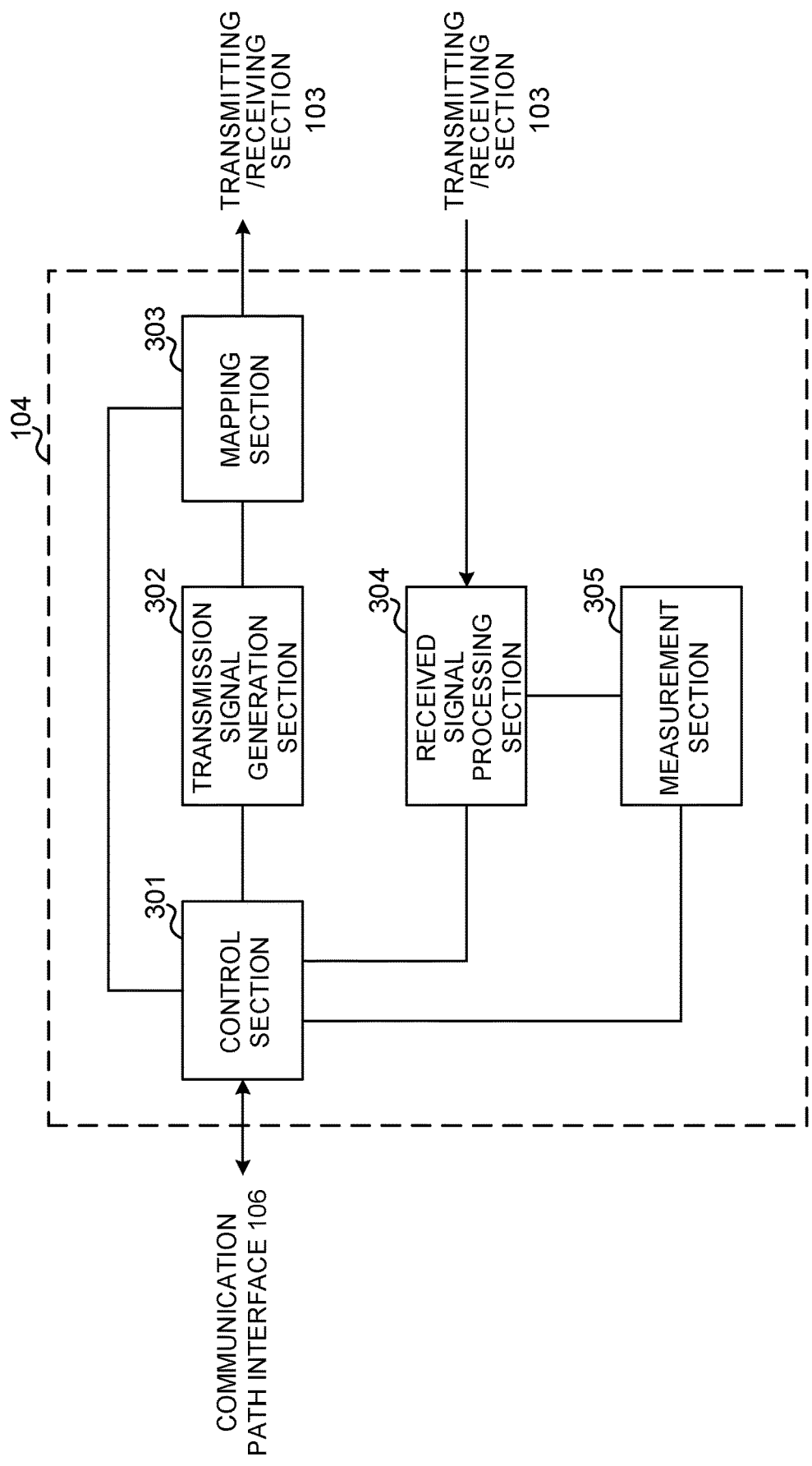
FIG. 15 is a diagram to show an exemplary functional structure of a radio base station, according to the present embodiment.

FIG. 15 is a diagram to show an exemplary functional structure of a radio base station according to the present embodiment. Note that, although FIG. 15 primarily shows functional blocks that pertain to characteristic parts of the present embodiment, the radio base station 10 has other functional blocks that are necessary for radio communication as well. As shown in FIG. 15, the baseband signal processing section 104 has a control section 301, a transmission signal generation section 302, a mapping section 303, a received signal processing section 304 and a measurement section 305.

The control section 301 controls the whole of the radio base station 10. The control section 301 controls, for example, the generation of DL signals by the transmission signal generation section 302, the mapping of DL signals by the mapping section 303, the receiving processes (for example, demodulation) for UL signals by the received signal processing section 304 and the measurements by the measurement section 305.

To be more specific, the control section 301 schedules user terminals 20. To be more specific, the control section 301 may control scheduling and/or retransmission for the DL data and/or uplink shared channels based on UCI (for example, CSI and/or BI) from the user terminal 20.

Also, the control section 301 may exert control so that the format of an uplink control channel (for example, a long PUCCH and/or a short PUCCH) is controlled, and control information related to this uplink control channel is transmitted.

Furthermore, the control section 301 may control PUCCH resources. To be more specific, the control section 301 may select one or more PUCCH resources to configure in the user terminal 20, from a given number of PUCCH resources that are determined in advance in the specification. In addition, the control section 301 may control at least one of generation and transmission of system information (for example, RMSI) indicating at least one of the selected PUCCH resources.

Also, the control section 301 may select an index value to include in the system information from multiple index values that at least indicate different numbers of PUCCH resources. For example, the control section 301 may select the index value based on the number of user terminals in the cell.

The control section 301 may control the received signal processing section 304 to perform receiving processes for the UCI from the user terminal 20 based on the format of the uplink control channel.

The control section 301 can be constituted by a controller, a control circuit or control apparatus that can be described based on general understanding of the technical field to which the present invention pertains.

The transmission signal generation section 302 generates DL signals (including DL data signals, DL control signals, DL reference signals and so on) as commanded by the control section 301, and outputs these signals to the mapping section 303.

The transmission signal generation section 302 can be constituted by a signal generator, a signal generating circuit or signal generating apparatus that can be described based on general understanding of the technical field to which the present invention pertains.

The mapping section 303 maps the DL signal generated in the transmission signal generation section 302 to a radio resource, as commanded by the control section 301, and outputs this to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding, etc.) of UL signals transmitted from the user terminals 20 (including, for example, a UL data signal, a UL control signal, a UL reference signal, etc.). To be more specific, the received signal processing section 304 may output the received signals, the signals after the receiving processes and so on, to the measurement section 305. In addition, the received signal processing section 304 performs UCI receiving processes based on the uplink control channel format specified by the control section 301.

The measurement section 305 conducts measurements with respect to the received signals. The measurement section 305 can be constituted by a measurer, a measurement circuit or measurement apparatus that can be described based on general understanding of the technical field to which the present invention pertains.

Also, the measurement section 305 may measure the channel quality in UL based on, for example, the received power (for example, RSRP (Reference Signal Received Power)) and/or the received quality (for example, RSRQ (Reference Signal Received Quality)) of UL reference signals. The measurement results may be output to the control section 301.

(User Terminal)

Figure 16:
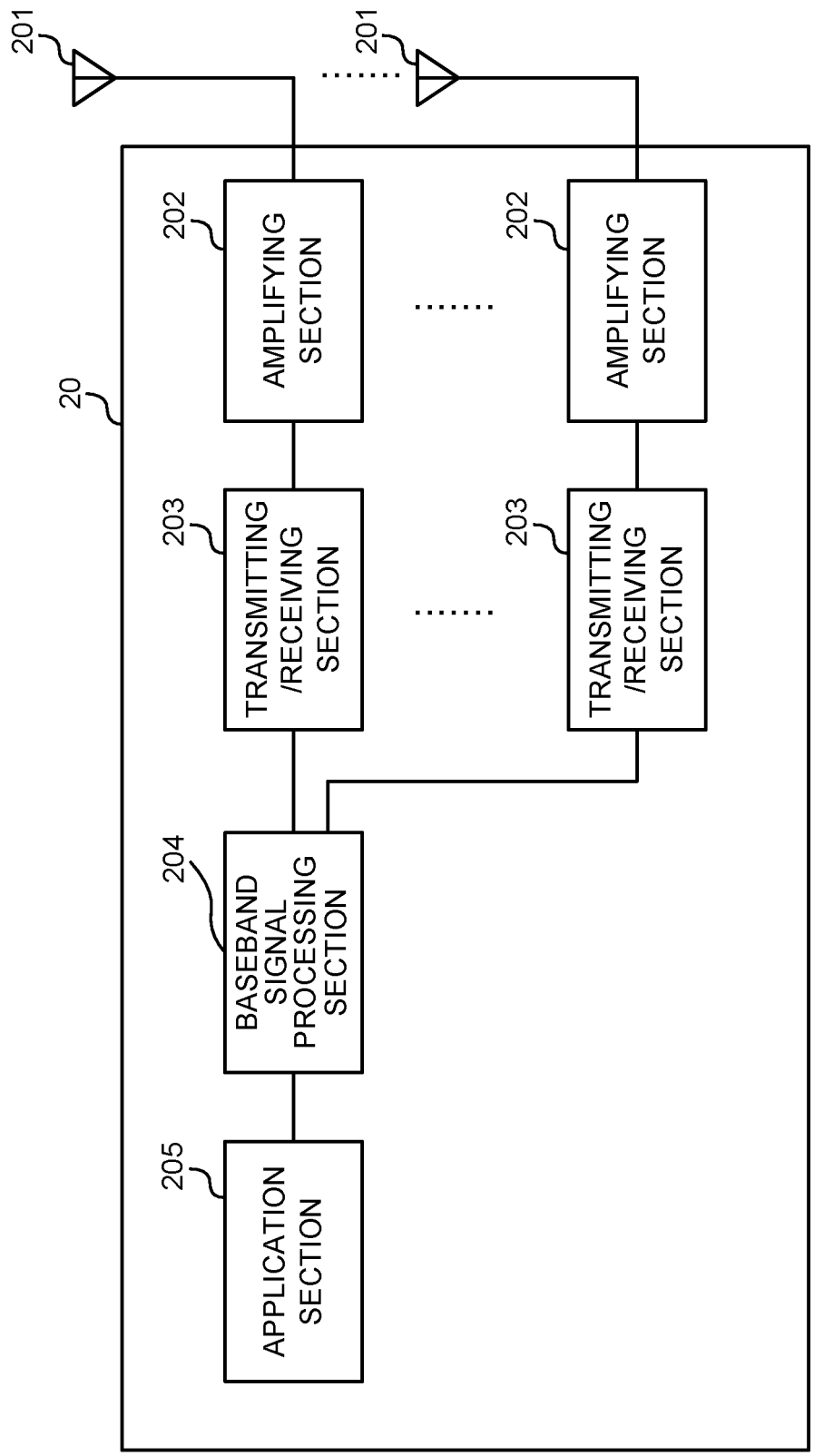
FIG. 16 is a diagram to show an exemplary overall structure of a user terminal, according to the present embodiment.

FIG. 16 is a diagram to show an exemplary overall structure of a user terminal according to the present embodiment. A user terminal 20 has a plurality of transmitting/receiving antennas 201 for MIMO communication, amplifying sections 202, transmitting/receiving sections 203, a baseband signal processing section 204 and an application section 205.

Radio frequency signals that are received in multiple transmitting/receiving antennas 201 are amplified in the amplifying sections 202. The transmitting/receiving sections 203 receive DL signals amplified in the amplifying sections 202. The received signals are subjected to frequency conversion and converted into the baseband signal in the transmitting/receiving sections 203, and output to the baseband signal processing section 204.

In the baseband signal processing section 204, the baseband signal that is input is subjected to an FFT process, error correction decoding, a retransmission control receiving process, and so on. The DL data is forwarded to the application section 205. The application section 205 performs processes related to higher layers above the physical layer and the MAC layer, and so on. Also, the broadcast information is also forwarded to application section 205.

Meanwhile, UL data is input from the application section 205 to the baseband signal processing section 204. The baseband signal processing section 204 performs a retransmission control transmission process (for example, an HARQ transmission process), channel coding, rate matching, puncturing, a discrete Fourier transform (DFT) process, an IFFT process and so on, and the result is forwarded to each transmitting/receiving section 203. UCI is also subjected to at least one of channel coding, rate matching, puncturing, a DFT process and an IFFT process, and the result is forwarded to each transmitting/receiving section 203.

Baseband signals that are output from the baseband signal processing section 204 are converted into a radio frequency band in the transmitting/receiving sections 203, and transmitted. The radio frequency signals that are subjected to frequency conversion in the transmitting/receiving sections 203 are amplified in the amplifying sections 202, and transmitted from the transmitting/receiving antennas 201.

Furthermore, the transmitting/receiving sections 203 receive DL signals (including DL data signals, DL control signals and DL reference signals) of the numerologies configured in the user terminal 20, and transmit UL signals (including UL data signals, UL control signals and UL reference signals) of these numerologies.

Also, the transmitting/receiving sections 203 transmit UCI to the radio base station 10 by using an uplink shared channel (for example, PUSCH) or an uplink control channel (for example, a short PUCCH and/or a long PUCCH).

Also, the transmitting/receiving sections 203 may transmit uplink control information by using an uplink control channel. Furthermore, the transmitting/receiving sections 203 may receive system information (for example, RMSI), which contains an index value that indicates one or more resources (PUCCH resources) for the uplink control channel. Also, the transmitting/receiving sections 103 may receive information that shows one or more resources for the uplink control channel via higher layer signaling (for example, RRC signaling).

A transmitting/receiving sections 203 can be constituted by a transmitter/receiver, a transmitting/receiving circuit or transmitting/receiving apparatus that can be described based on general understanding of the technical field to which the present invention pertains. Furthermore, a transmitting/receiving sections 203 may be structured as one transmitting/receiving section, or may be formed with a transmitting section and a receiving section.

Figure 17:
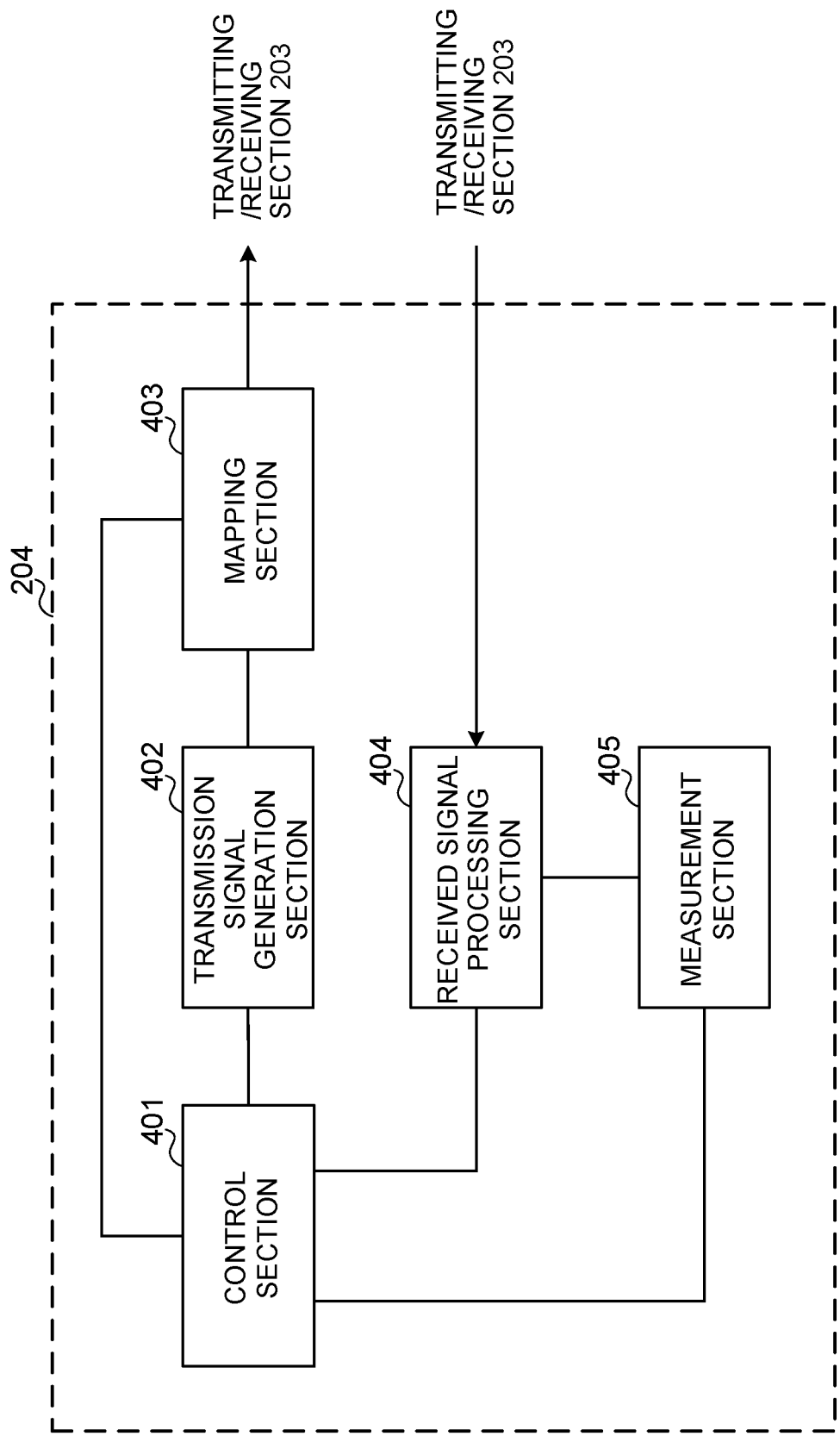
FIG. 17 is a diagram to show an exemplary functional structure of a user terminal, according to the present embodiment.

FIG. 17 is a diagram to show an exemplary functional structure of a user terminal according to the present embodiment. Note that, although FIG. 17 primarily shows functional blocks that pertain to characteristic parts of the present embodiment, the user terminal 20 may have other functional blocks that are necessary for radio communication as well. As shown in FIG. 17, the baseband signal processing section 204 provided in the user terminal 20 has a control section 401, a transmission signal generation section 402, a mapping section 403, a received signal processing section 404, and a measurement section 405.

The control section 401 controls the whole of the user terminal 20. The control section 401 controls, for example, the generation of UL signals in the transmission signal generation section 402, the mapping of UL signals in the mapping section 403, the DL signal receiving processes in the received signal processing section 404, the measurements in the measurement section 405 and so on.

In addition, the control section 401 controls the uplink control channel to use to transmit UCI from the user terminal 20 based on explicit indications from the radio base station 10 or based on implicit selection in the user terminal 20.

Also, the control section 401 may control the format of the uplink control channel (for example, a long PUCCH and/or a short PUCCH). The control section 401 may control the uplink control channel's format based on control information from the radio base station 10. In addition, the control section 401 may control the PUCCH format (the uplink control channel format) to use to transmit UCI based on information that relates to fallback.

Furthermore, the control section 401 may select the PUCCH resources to use in the PUCCH format based on higher layer signaling and/or downlink control information.

To be more specific, when UCI is transmitted by using the uplink control channel before RRC (Radio Resource Control) connection is set up, the control section 401 may select the resource for the uplink control channel to use to transmit the UCI, based on an index in system information (for example, RMSI).

For example, the control section 401 may select the resource for transmitting uplink control information from one or more PUCCH resources indicated by the above index value included in system information, based on at least one of a bit value in downlink control information and an implicit value (first embodiment).

Here, the index value included in the system information may be set from one or more index values that each indicate a number of resources, where the resource for transmitting the UCI can be selected by using the bit value alone, and one or more index values that each indicate a number of resources, where the resource for transmitting the UCI can be selected by using a combination of the bit value and the implicit value (FIG. 1 and FIG. 4).

In addition, the control section 401 may determine each parameter value of PUCCH resources based on a table that defines the parameter values included in the above one or more PUCCH resources indicated by the above index value (the second embodiment and the first example of determining parameter values). This table may be stored in the storage section of the user terminal 20.

In addition, the control section 401 may determine each parameter value of PUCCH resources based on a table that defines the parameter values included in a specific PUCCH resource among the one or more resources indicated by the above index value (the second embodiment and the second example of determining parameter values). This table may be stored in the storage section of the user terminal 20. Furthermore, based on these parameter values, the control section 401 may derive the parameter values included in other resources of the one or more resources.

The control section 401 can be constituted by a controller, a control circuit or control apparatus that can be described based on general understanding of the technical field to which the present invention pertains.

In the transmission signal generation section 402, UL signals (including UL data signals, UL control signals, UL reference signals, UCI, etc.) are generated (including, for example, encoding, rate matching, puncturing, modulation, etc.) as commanded by the control section 401, and output to the mapping section 403. The transmission signal generation section 402 can be constituted by a signal generator, a signal generating circuit or signal generating apparatus that can be described based on general understanding of the technical field to which the present invention pertains.

The mapping section 403 maps the UL signals generated in the transmission signal generation section 402 to radio resources as commanded by the control section 401, and output the result to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding, etc.) of DL signals (including DL data signals, scheduling information, DL control signals, DL reference signals, etc.). The received signal processing section 404 outputs the information received from the radio base station 10, to the control section 401. The received signal processing section 404 outputs, for example, broadcast information, system information, high layer control information related to higher layer signaling such as RRC signaling, physical layer control information (L1/L2 control information) and so on, to the control section 401.

The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present disclosure.

The measurement section 405 measures channel states based on reference signals (for example, CSI-RS) from the radio base station 10, and outputs the measurement results to the control section 401. Note that channel state measurements may be conducted per CC.

The measurement section 405 can be constituted by a signal processor, a signal processing circuit or signal processing apparatus, and a measurer, a measurement circuit or measurement apparatus that can be described based on general understanding of the technical field to which the present invention pertains.

(Hardware Structure)

Note that the block diagrams that have been used to describe the above embodiment show blocks in functional units. These functional blocks (components) may be implemented in arbitrary combinations of hardware and/or software. Also, the method for implementing each functional block is not particularly limited. That is, each functional block may be realized by one piece of apparatus that is physically and/or logically aggregated, or may be realized by directly and/or indirectly connecting two or more physically and/or logically-separate pieces of apparatus (by using cables and/or radio, for example) and using these multiple pieces of apparatus.

Figure 18:
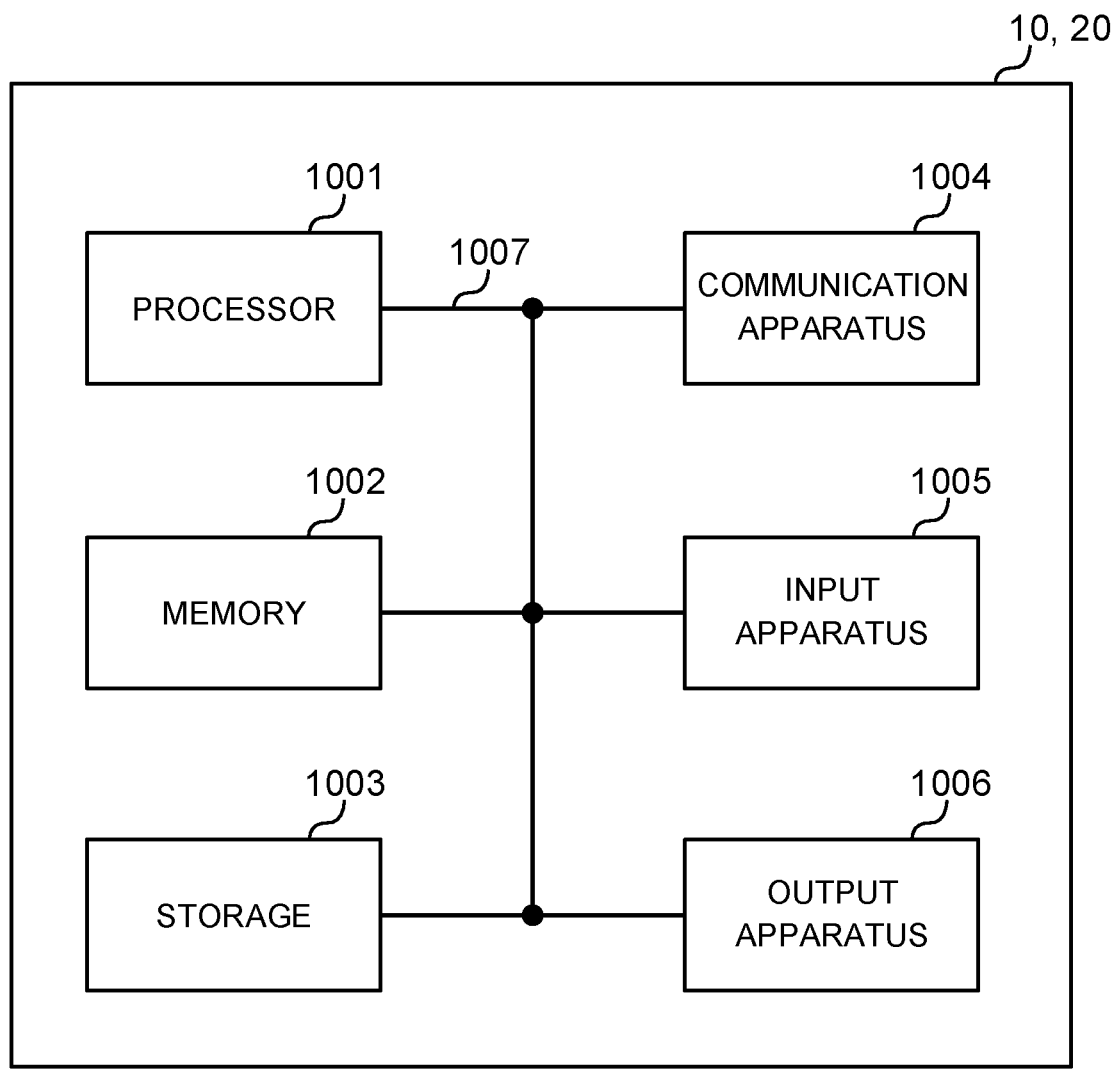
FIG. 18 is a diagram to show an exemplary hardware structure of a radio base station and a user terminal according to the present embodiment.

For example, the radio base station, user terminals and so on according to one embodiment of the present invention may function as a computer that executes the processes of the radio communication method of the present invention. FIG. 18 is a diagram to show an exemplary hardware structure of a radio base station and a user terminal according to one embodiment of the present invention. Physically, the above-described radio base stations 10 and user terminals 20 may be formed as a computer apparatus that includes a processor 1001, a memory 1002, a storage 1003, communication apparatus 1004, input apparatus 1005, output apparatus 1006, a bus 1007 and so on.

Note that, in the following description, the term "apparatus" may be replaced by "circuit," "device," "unit" and so on. Note that, the hardware structure of a radio base station 10 and a user terminal 20 may be designed to include one or more of each apparatus shown in the drawings, or may be designed not to include part of the apparatus.

For example, although only one processor 1001 is shown, a plurality of processors may be provided. Furthermore, processes may be implemented with one processor, or processes may be implemented simultaneously or in sequence, or by using different techniques, on one or more processors. Note that the processor 1001 may be implemented with one or more chips.

The functions of the radio base station 10 and the user terminal 20 are implemented by, for example, allowing hardware such as the processor 1001 and the memory 1002 to read given software (programs), and allowing the processor 1001 to do calculations, control communication that involves the communication apparatus 1004, control the reading and/or writing of data in the memory 1002 and the storage 1003, and so on.

The processor 1001 may control the whole computer by, for example, running an operating system. The processor 1001 may be constituted by a central processing unit (CPU), which includes interfaces with peripheral apparatus, control apparatus, computing apparatus, a register, and so on. For example, the above-described baseband signal processing section 104 (204), call processing section 105, and so on may be implemented by the processor 1001.

Furthermore, the processor 1001 reads programs (program codes), software modules, data, and so forth from the storage 1003 and/or the communication apparatus 1004, into the memory 1002, and executes various processes according to these. As for the programs, programs to allow computers to execute at least part of the operations of the above-described embodiment may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory), and other appropriate storage media. The memory 1002 may be referred to as a "register," a "cache," a "main memory (primary storage apparatus)," and so on. The memory 1002 can store executable programs (program codes), software modules and so on for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) or the like), a digital versatile disc, a Blu-ray (registered trademark) disk, etc.), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using cable and/or wireless networks, and may be referred to as, for example, a "network device," a "network controller," a "network card," a "communication module," and so on. The communication apparatus 1004 may be configured to include a high frequency switch, a duplexer, a filter, a frequency synthesizer and so on, in order to implement, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from outside (for example, a keyboard, a mouse, a microphone, a switch, a button, a sensor and so on). The output apparatus 1006 is an output device for allowing sending output to outside (for example, a display, a speaker, an LED (Light Emitting Diode) lamp, and so on). Note that the input apparatus 1005 and the output apparatus 1006 may be provided in an integrated structure (for example, a touch panel).

Furthermore, these pieces of apparatus, including the processor 1001, the memory 1002 and so on, are connected by the bus 1007, so as to communicate information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by these pieces of hardware. For example, the processor 1001 may be implemented with at least one of these pieces of hardware.

(Variations)

Note that, the terminology used in this specification and the terminology that is needed to understand this specification may be replaced by other terms that communicate the same or similar meanings. For example, a "channel" and/or a "symbol" may be replaced by a "signal" (or "signaling"). Also, a "signal" may be a "message." A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency," and so on.

Furthermore, a radio frame may be comprised of one or more periods (frames) in the time domain. One or more periods (frames) that constitute a radio frame may be each referred to as a "subframe." Furthermore, a subframe may be comprised of one or multiple slots in the time domain. A subframe may be a fixed time duration (for example, 1 ms), which does not depend on numerology.

Furthermore, a slot may be comprised of one or more symbols in the time domain (OFDM (Orthogonal Frequency Division Multiplexing) symbols, SC-FDMA (Single Carrier Frequency Division Multiple Access) symbols, and so on). Also, a slot may be a time unit based on numerology. Also, a slot may include a plurality of minislots. Each minislot may be comprised of one or more symbols in the time domain. Also, a minislot may be referred to as a "subslot."

A radio frame, a subframe, a slot, a minislot, and a symbol all refer to a unit of time in signal communication. A radio frame, a subframe, a slot, a minislot and a symbol may be each called by other applicable names. For example, one subframe may be referred to as a "transmission time interval (TTI)," or a plurality of consecutive subframes may be referred to as a "TTI," or one slot or mini-slot may be referred to as a "TTI." That is, a subframe and/or a TTI may be a subframe (1 ms) in existing LTE, may be a shorter period than 1 ms (for example, one to thirteen symbols), or may be a longer period of time than 1 ms. Note that the unit to represent a TTI may be referred to as a "slot," a "minislot" and so on, instead of a "subframe."

Here, a TTI refers to the minimum time unit for scheduling in radio communication, for example. For example, in LTE systems, a radio base station schedules the radio resources (such as the frequency bandwidth and transmission power each user terminal can use) to allocate to each user terminal in TTI units. Note that the definition of TTIs is not limited to this.

A TTI may be the transmission time unit of channel-encoded data packets (transport blocks), code blocks and/or codewords, or may be the unit of processing in scheduling, link adaptation, and so on. Note that, when a TTI is given, the period of time (for example, the number of symbols) in which transport blocks, code blocks and/or codewords are actually mapped may be shorter than the TTI.

Note that, when one slot or one minislot is referred to as a "TTI," one or more TTIs (that is, one or multiple slots or one or more minislots) may be the minimum time unit of scheduling. Also, the number of slots (the number of minislots) to constitute this minimum time unit for scheduling may be controlled.

A TTI having a time length of 1 ms may be referred to as a "normal TTI" (TTI in LTE Rel. 8 to 12), a "long TTI," a "normal subframe," a "long subframe," and so on. A TTI that is shorter than a normal TTI may be referred to as a "shortened TTI," a "short TTI," a "partial TTI (or a "fractional TTI")," a "shortened subframe," a "short subframe," a "minislot," a "sub-slot," and so on.

Note that a long TTI (for example, a normal TTI, a subframe, etc.) may be replaced with a TTI having a time duration exceeding 1 ms, and a short TTI (for example, a shortened TTI) may be replaced with a TTI having a TTI length less than the TTI length of a long TTI and not less than 1 ms.

A resource block (RB) is the unit of resource allocation in the time domain and the frequency domain, and may include one or a plurality of consecutive subcarriers in the frequency domain. Also, an RB may include one or more symbols in the time domain, and may be one slot, one minislot, one subframe or one TTI in length. One TTI and one subframe each may be comprised of one or more resource blocks. Note that one or more RBs may be referred to as a "physical resource block (PRB (Physical RB))," a "subcarrier group (SCG)," a "resource element group (REG)," a "PRB pair," an "RB pair," and so on.

Furthermore, a resource block may be comprised of one or more resource elements (REs). For example, one RE may be a radio resource region of one subcarrier and one symbol.

Note that the structures of radio frames, subframes, slots, minislots, symbols, and so on described above are simply examples. For example, configurations pertaining to the number of subframes included in a radio frame, the number of slots included in a subframe or a radio frame, the number of minislots included in a slot, the number of symbols and RBs included in a slot or a minislot, the number of subcarriers included in an RB, the number of symbols in a TTI, the symbol duration, the length of cyclic prefixes (CPs), and so on can be variously changed.

Also, the information and parameters described in this specification may be represented in absolute values or in relative values with respect to given values, or may be represented using other applicable information. For example, a radio resource may be specified by a given index.

The names used for parameters and so on in this specification are in no respect limiting. For example, since various channels (PUCCH (Physical Uplink Control CHannel), PDCCH (Physical Downlink Control CHannel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals, and so on can be output from higher layers to lower layers, and/or from lower layers to higher layers. Information, signals, and so on may be input and/or output via a plurality of network nodes.

The information, signals, and so on that are input and/or output may be stored in a specific location (for example, in a memory), or may be managed in a control table. The information, signals, and so on to be input and/or output can be overwritten, updated, or appended. The information, signals, and so on that are output may be deleted. The information, signals, and so on that are input may be transmitted to other pieces of apparatus.

The method of reporting information is by no means limited to those used in the examples/embodiments described in this specification, and other methods may be used as well. For example, reporting of information may be implemented by using physical layer signaling (for example, downlink control information (DCI), uplink control information (UCI)), higher layer signaling (for example, RRC (Radio Resource Control) signaling, broadcast information (the master information block (MIB), system information blocks (SIBs) and so on), MAC (Medium Access Control) signaling, etc.), and other signals and/or combinations of these.

Note that physical layer signaling may be referred to as "L1/L2 (Layer 1/Layer 2) control information (L1/L2 control signals)," "L1 control information (L1 control signal)," and so on. Also, RRC signaling may be referred to as "RRC messages," and can be, for example, an "RRC connection setup message," "RRC connection reconfiguration message," and so on. Also, MAC signaling may be reported using, for example, MAC control elements (MAC CEs (Control Elements)).

Also, reporting of given information (for example, reporting of information to the effect that "X holds") does not necessarily have to be sent explicitly, and can be sent in an implicit way (for example, by not reporting this piece of information, by reporting another piece of information, and so on).

Decisions may be made in values represented by one bit (0 or 1), may be made in Boolean values that represent true or false, or may be made by comparing numerical values (for example, comparison against a given value).

Software, whether referred to as "software," "firmware," "middleware," "microcode," or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions, and so on.

Also, software, instructions, information and so on may be transmitted and received via communication media. For example, when software is transmitted from a website, a server or other remote sources by using wired technologies (coaxial cables, optical fiber cables, twisted-pair cables, digital subscriber lines (DSL) and so on), and/or wireless technologies (infrared radiation, microwaves, and so on), these wired technologies and/or wireless technologies are also included in the definition of communication media.

The terms "system" and "network" as used herein are used interchangeably.

As used herein, the terms "base station (BS)," "radio base station," "eNB," "gNB," "cell," "sector," "cell group," "carrier," and "component carrier" may be used interchangeably. A base station may be referred to as a "fixed station," a "NodeB," an "eNodeB (eNB)," an "access point," a "transmission point," a "receiving point," a "transmitting/receiving point," a "femto cell," a "small cell," and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

As used herein, the terms "mobile station (MS)," "user terminal," "user equipment (UE)," and "terminal" may be used interchangeably.

A mobile station may be referred to as a "subscriber station," a "mobile unit," a "subscriber unit," a "wireless unit," a "remote unit," a "mobile device," a "wireless device," a "wireless communication device," a "remote device," a "mobile subscriber station," an "access terminal," a "mobile terminal," a "wireless terminal," a "remote terminal," a "handset," a "user agent," a "mobile client," a "client," or some other suitable terms.

A base station and/or a mobile station may be referred to as "transmitting apparatus," "receiving apparatus," and the like.

Furthermore, the radio base stations in this specification may be interpreted as user terminals. For example, the examples/embodiments of the present disclosure may be applied to a configuration in which communication between a radio base station and a user terminal is replaced with communication among a plurality of user terminals (D2D (Device-to-Device)). In this case, user terminals 20 may have the functions of the radio base stations 10 described above. In addition, terms such as "uplink" and "downlink" may be interpreted as "side." For example, an "uplink channel" may be interpreted as a "side channel."

Likewise, the user terminals in this specification may be interpreted as radio base stations. In this case, the radio base stations 10 may have the functions of the user terminals 20 described above.

Certain actions which have been described in this specification to be performed by base stations may, in some cases, be performed by their upper nodes. In a network comprised of one or more network nodes with base stations, it is clear that various operations that are performed so as to communicate with terminals can be performed by base stations, one or more network nodes (for example, MMEs (Mobility Management Entities), S-GWs (Serving-Gateways), and so on may be possible, but these are not limiting) other than base stations, or combinations of these.

The examples/embodiments illustrated in this specification may be used individually or in combinations, which may be switched depending on the mode of implementation. Also, the order of processes, sequences, flowcharts, and so on that have been used to describe the examples/embodiments herein may be re-ordered as long as inconsistencies do not arise. For example, although various methods have been illustrated in this specification with various components of steps in exemplary orders, the specific orders that are illustrated herein are by no means limiting.

The examples/embodiments illustrated in this specification may be applied to systems that use LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (registered trademark) (Global System for Mobile communications), CDMA2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), other adequate radio communication methods, and/or next-generation systems that are enhanced based on these.

The phrase "based on" as used in this specification does not mean "based only on" unless otherwise specified. In other words, the phrase "based on" means both "based only on" and "based at least on."

Reference to elements with designations such as "first," "second," and so on as used herein does not generally limit the number/quantity or order of these elements. These designations are used herein only for convenience, as a method for distinguishing between two or more elements. In this way, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database, or some other data structure), ascertaining, and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing, and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical, or a combination of these. For example, "connection" may be interpreted as "access."

As used herein, when two elements are connected, these elements may be considered "connected" or "coupled" to each other by using one or more electrical wires, cables, and/or printed electrical connections, and, as a number of non-limiting and non-inclusive examples, by using electromagnetic energy having wavelengths of the radio frequency region, the microwave region and/or the optical region (both visible and invisible).

In the present specification, the phrase "A and B are different" may mean "A and B are different from each other." The terms such as "leave," "coupled" and the like may be interpreted as well.

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The invention claimed is:

1. A terminal comprising:
a receiver that receives a system information block before establishing a radio resource control connection; and
a processor that determines one physical uplink control channel (PUCCH) resource set from a plurality of PUCCH resource sets based on an index within the system information block, and determines one PUCCH resource from a plurality of PUCCH resources within the PUCCH resource set based on a control channel element (CCE) index and a PUCCH resource indicator field within a downlink control information (DCI),
wherein at least two of the plurality of PUCCH resources have different start physical resource block indices,
wherein all of the plurality of PUCCH resources includes a same number of symbols and a same start symbol index, and at least two PUCCH resources out of the plurality of PUCCH resources include different initial cyclic shift indexes, and
wherein a set of the initial cyclic shift indexes is different for each PUCCH format.

2. The terminal according to claim 1, wherein the PUCCH resource set is cell specific.

3. The terminal according to claim 1, wherein a set of initial cyclic shift indexes {0, 4, 8} is supported for PUCCH format 0 as the set of the initial cyclic shift indexes, and a set of initial cyclic shift indexes {0, 3, 6, 9} is supported for PUCCH format 1 as the set of the initial cyclic shift indexes.

4. The terminal according to claim 1, wherein the initial cyclic shift indexes are determined in the set of the initial cyclic shift indexes.

5. The terminal according to claim 1, wherein whether frequency hopping is applied to the plurality of PUCCH resources depends on whether a frequency range is higher than a threshold.

6. A radio communication method for a terminal comprising:
receiving a system information block before a radio resource control connection; and
determining one physical uplink control channel (PUCCH) resource set from a plurality of PUCCH resource sets based on an index within the system information block, and determining one PUCCH resource from a plurality of PUCCH resources within the PUCCH resource set based on a control channel element (CCE) index and a PUCCH resource indicator field within a downlink control information (DCI),
wherein at least two of the plurality of PUCCH resources have different start physical resource block indices,
wherein all of the plurality of PUCCH resources includes a same number of symbols and a same start symbol index, and at least two PUCCH resources out of the plurality of PUCCH resources include different initial cyclic shift indexes, and
wherein a set of the initial cyclic shift indexes is different for each PUCCH format.

7. A base station comprising:
a transmitter that transmits a system information block before a radio resource control connection; and
a processor that controls reception of a physical uplink control channel (PUCCH) in a PUCCH resource,
wherein one PUCCH resource set is determined from a plurality of PUCCH resource sets based on an index within the system information block,
the PUCCH resource is determined from a plurality of PUCCH resources within the PUCCH resource set based on a control channel element (CCE) index and a PUCCH resource indicator field within a downlink control information (DCI),
all of the plurality of PUCCH resources includes a same number of symbols and a same start symbol index,
at least two of the plurality of PUCCH resources have different start physical resource block indices,
at least two PUCCH resources out of the plurality of PUCCH resources include different initial cyclic shift indexes, and
a set of the initial cyclic shift indexes is different for each PUCCH format.

8. A system comprising a terminal and a base station, wherein:
the terminal comprises:
a receiver that receives a system information block before establishing a radio resource control connection; and
a processor that determines one physical uplink control channel (PUCCH) resource set from a plurality of PUCCH resource sets based on an index within the system information block, and determines one PUCCH resource from a plurality of PUCCH resources within the PUCCH resource set based on a control channel element (CCE) index and a PUCCH resource indicator field within a downlink control information (DCI), and
the base station comprises:
a transmitter that transits the system information block before the radio resource control connection,
wherein at least two of the plurality of PUCCH resources have different start physical resource block indices,
wherein all of the plurality of PUCCH resources includes a same number of symbols and a same start symbol index, and at least two PUCCH resources out of the plurality of PUCCH resources include different initial cyclic shift indexes, and
wherein a set of the initial cyclic shift indexes is different for each PUCCH format.

* * * * *